United States Patent

Ito

[11] Patent Number: 5,875,455
[45] Date of Patent: Feb. 23, 1999

[54] INFORMATION RECORDING AND REPRODUCING APPARATUS MERGING SEQUENTIAL RECORDING REQUESTS INTO A SINGLE RECORDING REQUEST, AND METHOD OF DATA CACHING FOR SUCH APPARATUS

[75] Inventor: Motoshi Ito, Osaka, Japan

[73] Assignee: Matsushita Electric Industrial Co., Ltd., Osaka, Japan

[21] Appl. No.: 756,759

[22] Filed: Nov. 26, 1996

Related U.S. Application Data

[62] Division of Ser. No. 475,516, Jun. 7, 1995.

[30] Foreign Application Priority Data

Jun. 10, 1994 [JP] Japan .................................. 6-129074

[51] Int. Cl.$^6$ .............................. G06F 12/08; G06F 13/20
[52] U.S. Cl. ............................ 711/113; 711/143; 395/872
[58] Field of Search .................................. 395/440, 470, 395/439, 872, 874; 711/113, 112, 143, 138

[56] References Cited

U.S. PATENT DOCUMENTS

| | | | |
|---|---|---|---|
| 3,737,881 | 6/1973 | Cordi et al. | 711/116 |
| 5,239,640 | 8/1993 | Froemke et al. | 395/180 |
| 5,293,609 | 3/1994 | Shih et al. | 395/876 |
| 5,381,528 | 1/1995 | Brunnelle | 711/137 |
| 5,537,552 | 7/1996 | Ogasawara et al. | 395/877 |
| 5,566,317 | 10/1996 | Trieber et al. | 711/117 |
| 5,584,007 | 12/1996 | Ballard | 711/113 |
| 5,590,307 | 12/1996 | McClure | 711/131 |
| 5,664,145 | 9/1997 | Apperley et al. | 395/872 |

FOREIGN PATENT DOCUMENTS 5-274089 10/1993 Japan .
5-274090 10/1993 Japan .

*Primary Examiner*—Reginald G. Bragdon
*Attorney, Agent, or Firm*—Ratner & Prestia

[57] ABSTRACT

An information recording and reproducing apparatus includes a record merge buffer which stores blocks of data bound for a disk. A write back mechanism stores blocks of data in the record merge buffer and reports to a host device that a recording operation is complete. A write merge mechanism writes new data that is continuous with data that is being recorded on the disk in the record merge buffer while continuing the recording operation such that the new data is continuous with the data being recorded and is written to the disk in the same recording operation. A write queue management mechanism writes new data that is not continuous with the data being recorded on the disk in the record merge buffer such that the new data is recorded in the record merge buffer at a distance from the data being recorded to the disk that is the same as the distance on the recording medium between the data. When the recording operation is complete, a queue back transition mechanism ensures that record pending data is recorded to the disk.

4 Claims, 23 Drawing Sheets

FIG. 3A
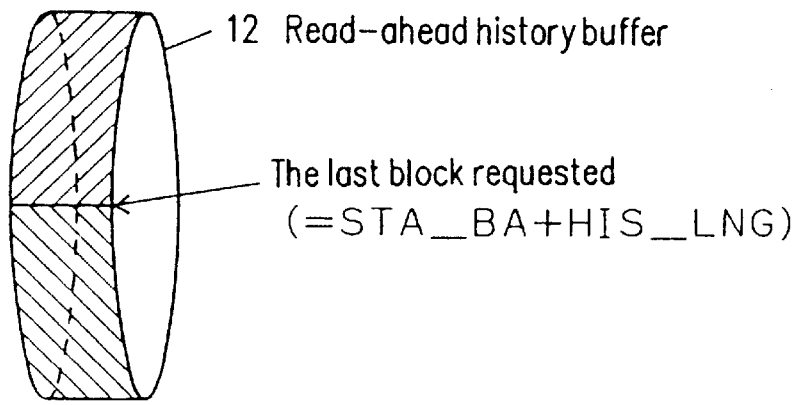
FIG. 3B
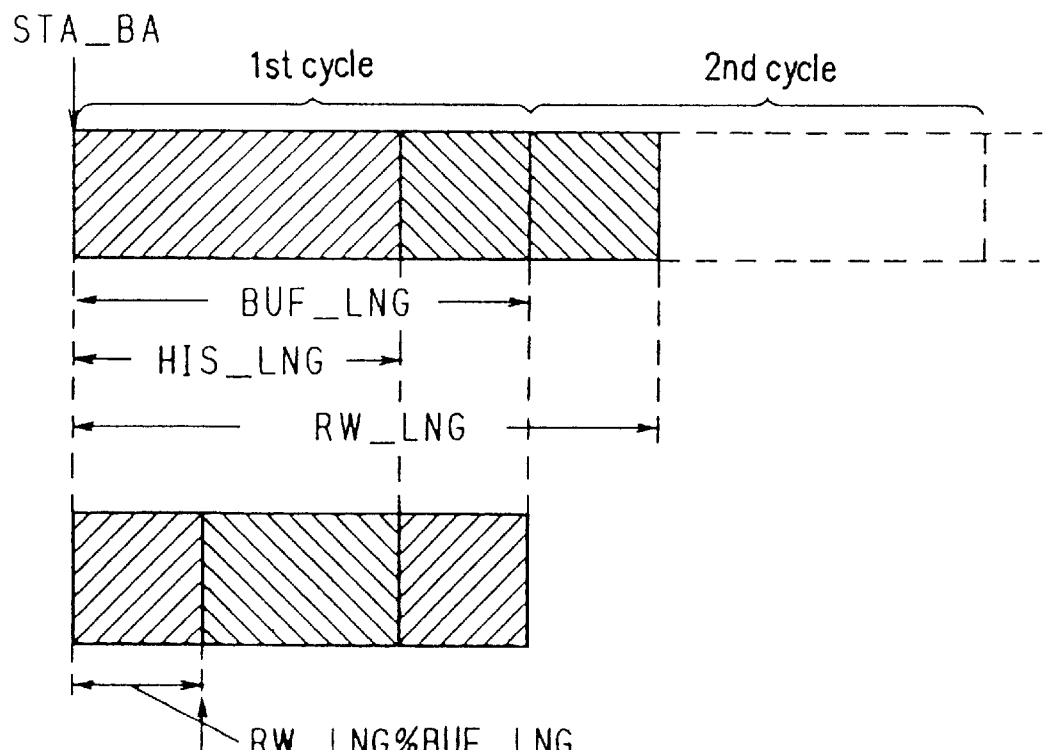

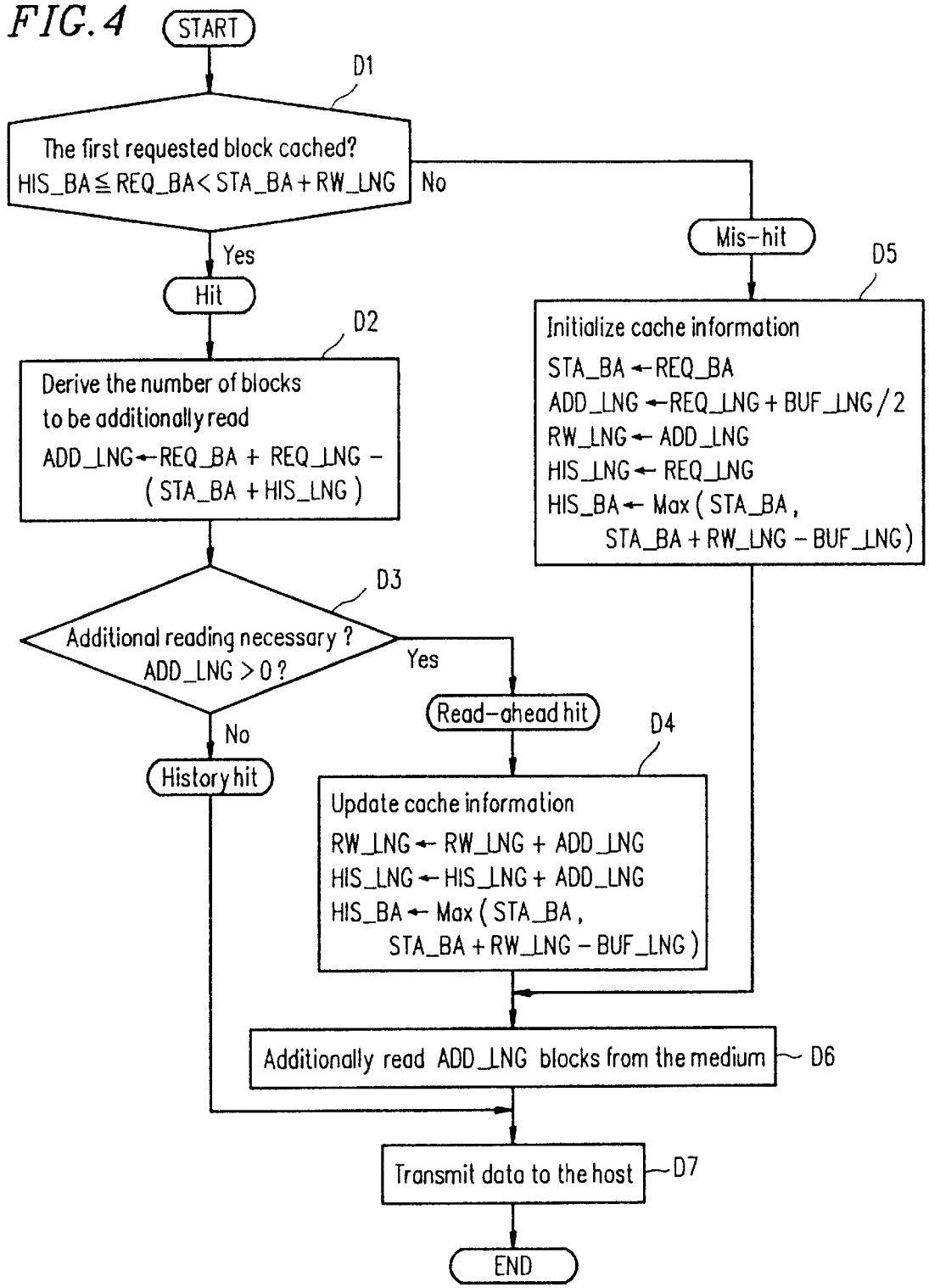

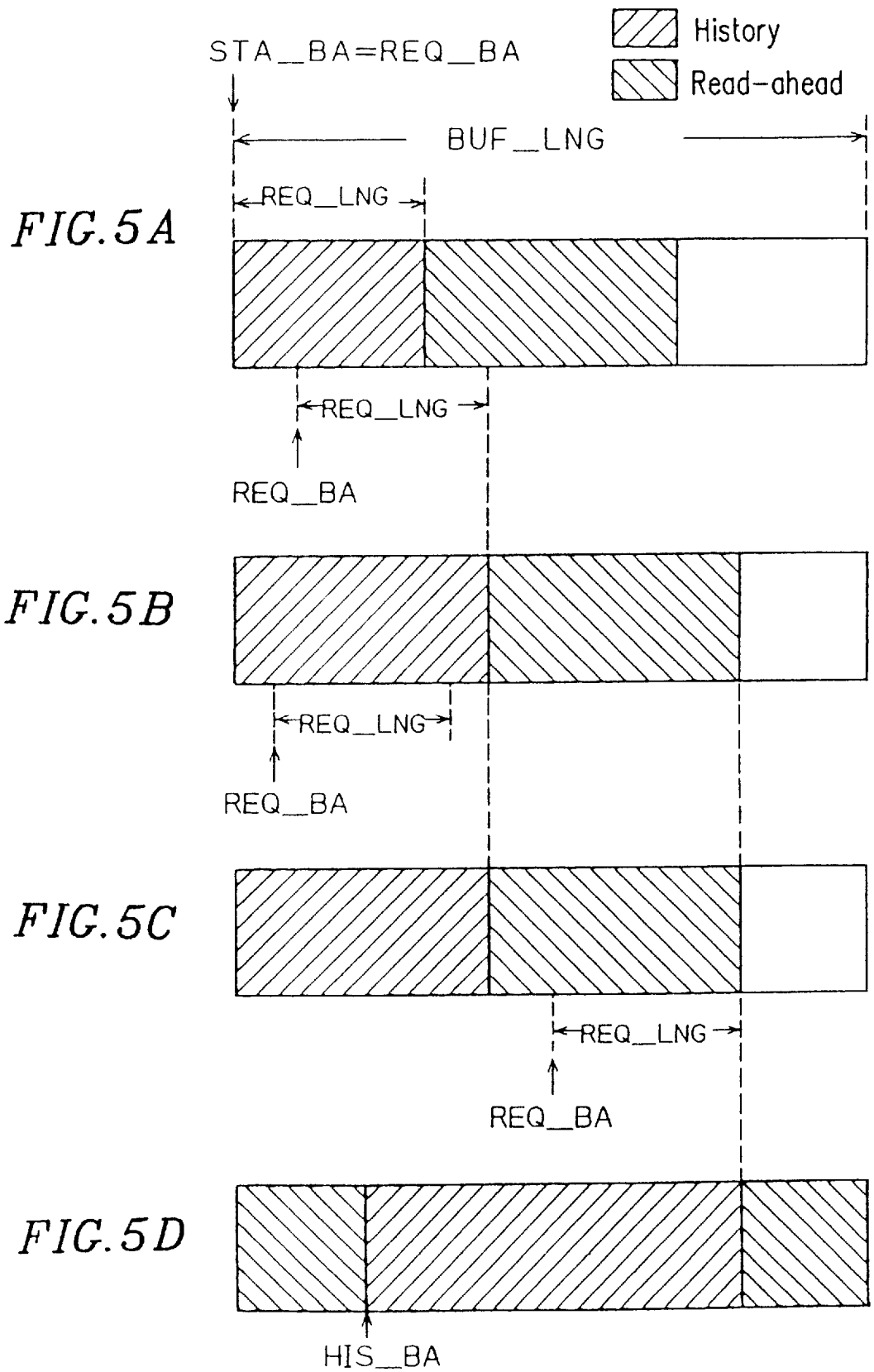

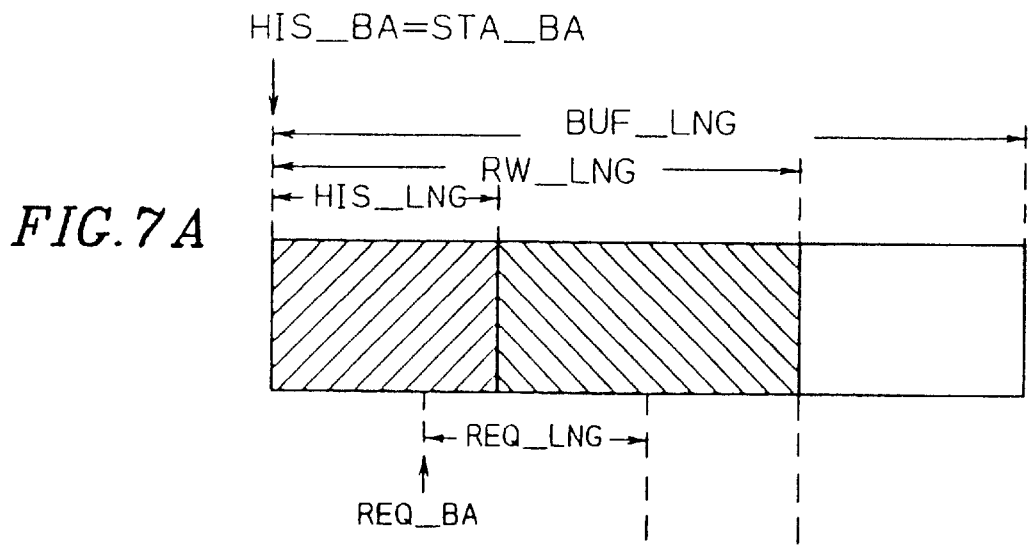
FIG. 7A
FIG. 7B
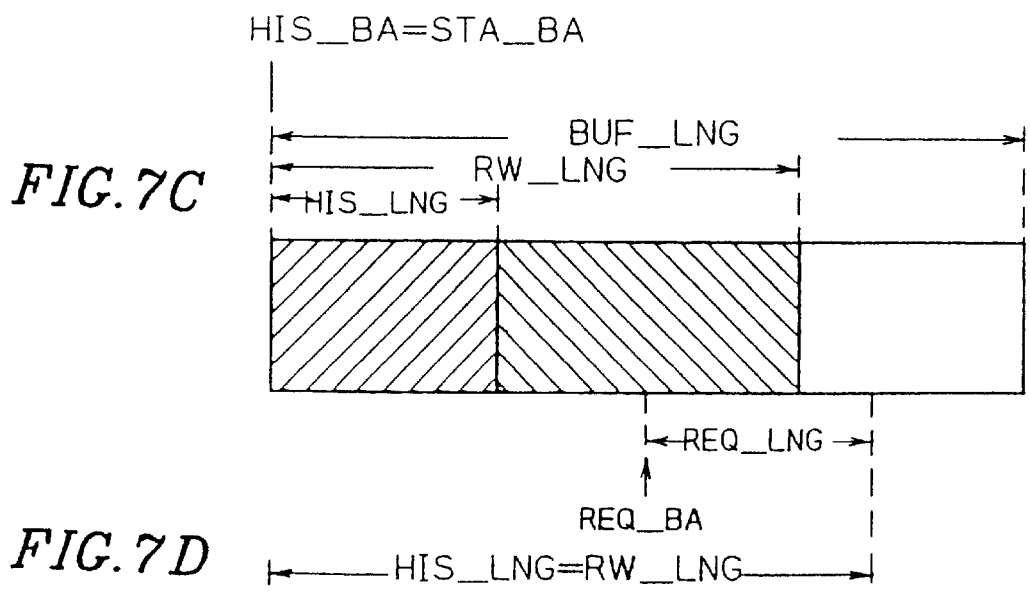
FIG. 7C
FIG. 7D

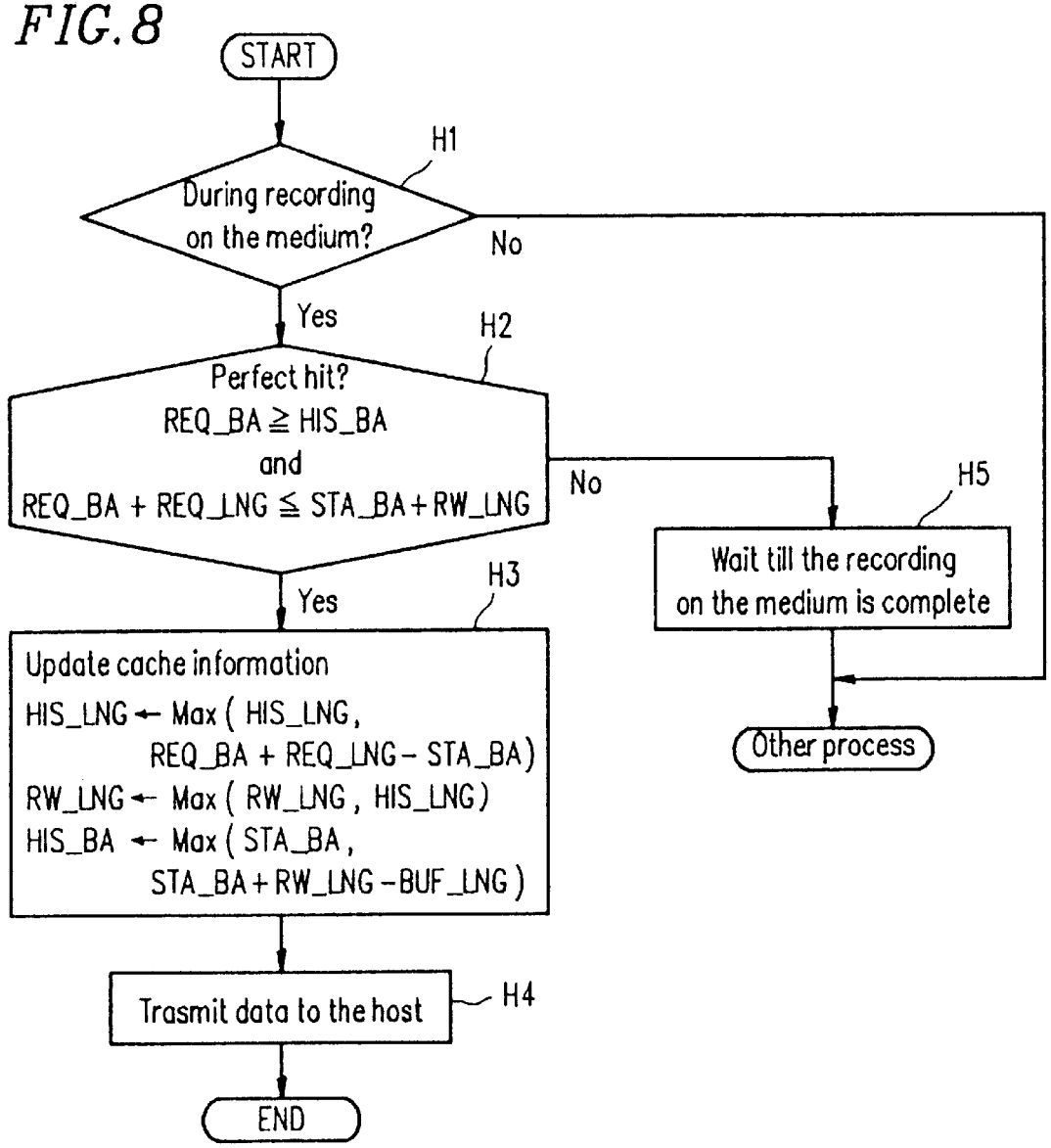

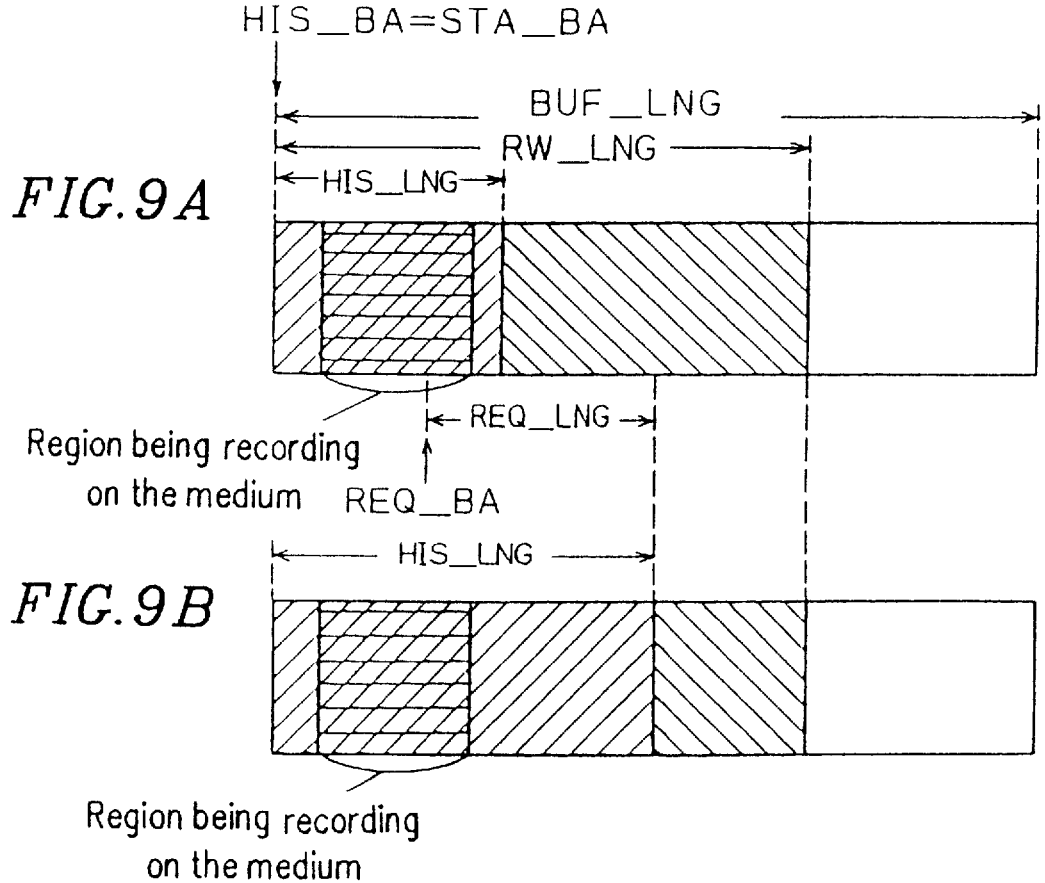

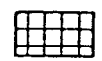
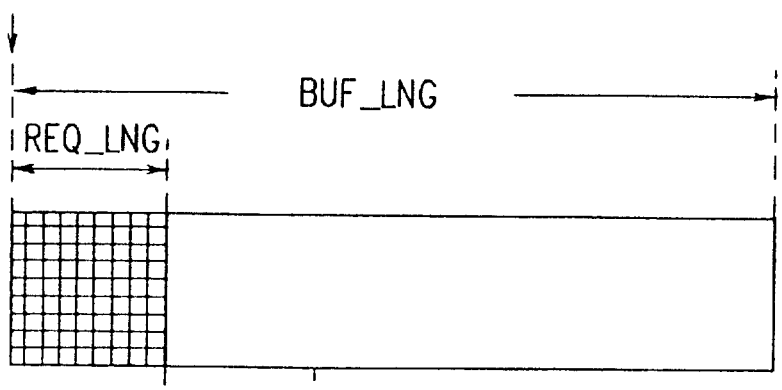
FIG.13A
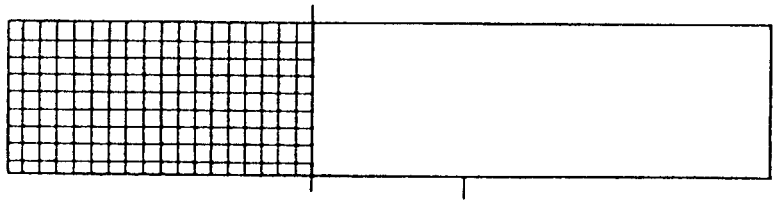
FIG.13B
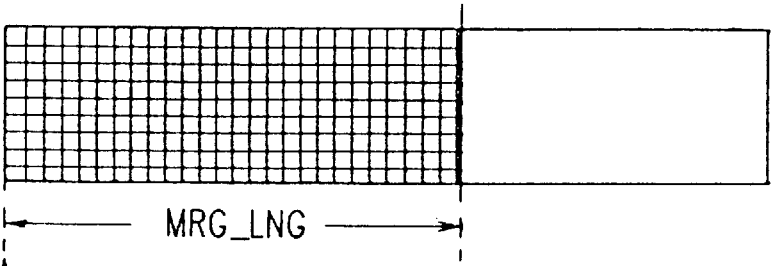
FIG.13C

INFORMATION RECORDING AND REPRODUCING APPARATUS MERGING SEQUENTIAL RECORDING REQUESTS INTO A SINGLE RECORDING REQUEST, AND METHOD OF DATA CACHING FOR SUCH APPARATUS

This application is a division of application Ser. No. 08/475,516, filed Jun. 7, 1995, (status: pending).

BACKGROUND OF THE INVENTION

1. Field of the Invention

The present invention relates to an information recording and reproducing apparatus for recording/reproducing information on a disk-shaped information recording medium block by block. In particular, the present invention relates to an information recording and reproducing apparatus having both history caching and read-ahead caching functions.

2. Description of the Related Art

In recent years, the operation speed of host computers has increased, making a large gap between the computer speed and the speed of external storage apparatuses (e.g., information recording and reproducing apparatus such as hard disk drives and optical disk drives). In order to reduce this gap, the speed of external storage apparatuses has been increased. There are two general methods for achieving improvement in the speed of an external storage apparatus: One is a physical improvement in speed, which is achieved by enhancing the rotation rate of a storage medium and reducing the seek time, i.e., the time required for a head to move to a target track of a storage medium. The other is a logical improvement, which is achieved by data caching techniques, that is, incorporating a buffer composed of a semiconductor memory in the apparatus and transferring data which is requested by a host computer and happens to be in the buffer to the host computer, without accessing the recording medium.

Data cache is classified into read caching and write caching. Read caching increases the speed of reproduction operations, whereas write caching increases the speed of recording operations. Read caching is further classified into a history type and a read-ahead type. According to history read caching, data which has previously been requested by a host computer is retained as cache data. According to read-ahead read caching, data which is next to data requested by a host computer is retained as cache data in advance.

In the field of large-scale computers, history read caching has long been studied with an aim to construct a hierarchial structure having components ranging from high-speed and low-capacity memories to low-speed and high-capacity memories into a high-speed and high-capacity memory as a whole.

According to the history read caching technique, a high-speed memory is divided into a plurality of smaller regions (referred to as "pages") so as to retain and manage data which has previously been read from a low-speed memory. If requested data happens to be in one of the pages (described as a "hit"), the data in that page is transferred as required data instead of reading from the low-speed memory. If the requested data is not in any pages of the high-speed memory (described as a "mis-hit"), data is read from the low-speed memory into a page so as to be transferred as the requested data. If every page of the high-speed memory stores previously requested data, it is necessary to discard the old data stored in one of the pages in order to read data from the low-speed memory into that page. The algorithms for history read caching can be classified according to the method of selecting the page of which data should be discarded. One popular algorithm for history read caching is a LRU (Least Recently Use) algorithm (An application of the LRU algorithm to a magnetic bubble memory is described in U.S. Pat. No. 3,737,881 issued to Vincent A. Cordi et al). According to the LRU algorithm, when there has been a mis-hit, the data in the page for which has not been accessed for the longest time is discarded so as to store information from a high-speed memory in that page. This algorithm utilizes the fact that the more recently the data has been accessed, the more likely the data is to be referred to again.

Read-ahead type read caching will now be described. According to this technique, the reproduction speed of an information recording and reproducing apparatus for recording/reproducing information on a disk-shaped information recording medium, e.g., a hard disk drive, is enhanced by eliminating moments during which the device is required to wait for the rotation of the disk. Usually, when an OS (Operation System) or an application which works on a computer tries to read out a file, it does not request the entire file to be reproduced at a time, but sequentially requests smaller units of the file, beginning from the top of the file. Such accesses are referred to as sequential accesses. For example, a case is contemplated where sequential accesses are made to blocks 1 to 10 in a block-by-block manner. This case will be described with reference to FIG. 19, which is a conceptual diagram showing a disk-shaped information recording medium.

In FIG. 19, each small fan-shaped portion represents a "sector", the number written in each sector representing the sector number thereof. A concentric group of sectors constitute a track. Reference numerals T0 to T2 represent the track numbers of the respective tracks. In the case where sectors are disposed in a spiral arrangement, one cycle of the spiral defines a track. For conciseness, sector s of track t will be referred to as (t, s) hereinafter. Block 1 corresponds to (T0, 1). Block 2 corresponds to (T0, 2) . . . Block 10 corresponds to (T0, 10). If the information recording medium rotates counterclockwise, the blocks in one concentric circle (track) are accessed clockwise.

When a host computer requests block 1, the information recording and reproducing apparatus accesses (T0, 1) by using a head and transfers the data reproduced therefrom to the host computer. Even if the host computer requests block 2 immediately afterward, the head is passing by (T0, 2). Accordingly, the head must wait until the information recording medium makes an almost complete turn (i.e., rotate once) before the head can access (T0, 2). In other words, one rotation is required in order to reproduce information stored in one block. As a result, 10 rotations are required in order to reproduce information stored in blocks 1 to 10. In order to solve this problem, when a host computer requests the reproduction of information in a given block, blocks that are located forward with respect to the one that is requested by the host computer are read in a high-speed memory (i.e., a data buffer composed of a semiconductor memory). If a block which is requested next has been read into the data buffer (described as a "hit") in advance, the data in the data buffer is transferred to the host computer without accessing the information recording medium. According to this technique, it is possible to reproduce the data stored in blocks 1 to 10 by only one rotation of the information recording medium. Recently, Iida et al. has disclosed an information recording and reproducing apparatus in Japanese Laid-Open Patent Publication No. 5-274090, which information recording and reproducing apparatus features read-ahead type read caching. Since a large number of consecutive blocks are read out in sequential accesses, it is often the case that the data buffer is used as a ring buffer (i.e., when the last end of the buffer is reached, the control returns to the top end of the buffer).

In order to obtain an information recording and reproducing apparatus capable of both history type read caching and read-ahead type read caching based on a conventional technique, the following scheme is required:

(1) an internal data buffer is split into two, one being defined as a history cache data region and the other being defined as a read-ahead cache data region;

(2) a history type algorithm is applied to the history cache data region, while a read-ahead type algorithm is applied to the read-ahead cache data region;

(3) on receiving a request from a host computer, a retrieval is attempted to determine which cache data a requested block hits;

(4) if the requested block does not "hit" at (3), the block is read out from the information recording medium to the internal data buffer; and (5) it is determined which algorithm should be applied to the block that was read out at (4), which is to be stored as cache data.

However, the history type algorithm and the readahead type algorithm are completely different from each other, so that it is difficult to dynamically vary the sizes of the respective cache data regions. Accordingly, the internal buffer is likely to be split into the two regions at a fixed boundary at (1).

Next, write caching will be described. Representative write caching techniques are write-through caching and write-back caching. One similarity between the two write caching techniques is that when the content of a low-speed memory is updated, the change is reflected on a high-speed memory, so that the high-speed memory is accessed when referring to the updated content of the low-speed memory. The method for managing the data in the high-speed memory is similar to that of history type read caching. The two write caching techniques are different in that, according to the write-through caching, the control must wait until the low-speed memory is updated, whereas according to the write-back caching, the control does not wait until the low-speed memory is updated. Although both techniques can reduce the amount of time required for referring to information, only the write-back caching can reduce the amount of time required for updating information.

When a recording operation for one sector is required, an information recording and reproducing apparatus in which an disk-shaped information recording medium is rotated, e.g., a hard disk drive or an optical disk drive, requires a seek time (during which a head moves to a track including a target sector) and a rotation waiting time (during which the target sector is reached). In particular, an optical disk drive requires extra time because the content of the sector is erased before the recording, and a verification reproduction is performed after the recording. FIG. 20 shows a recording operation of an optical disk drive. The operation is as follows:

(Step U1) Seek a target track;

(Step U2) Rotation waiting (by ½ rotations on average) till the head arrives at the target sector;

(Step U3) Erase one sector (i.e., target sector);

(Step U4) Rotation waiting (by 1 rotation) till the head arrives at the target sector;

(Step U5) Record one sector (i.e., target sector);

(Step U6) Rotation waiting (by 1 rotation) till the head arrives at the target sector; and (Step U7) One sector (i.e., target sector) is reproduced for verification.

Thus, a sum of an average rotation waiting time of 2.5 rotations plus seek time is required for performing a recording for one sector. This is very slow compared with the speed of the bus to which a host computer and the optical disk drive are connected. Accordingly, by adopting the write-back caching technique, under which the host computer is notified that a recording operation is complete as soon as data to be recorded is stored in a data buffer in the optical disk drive, followed by the actual recording of the data stored in the data buffer on the optical disk, the speed of the recording operation as viewed from the host computer is improved. In the case of a hard disk drive, recording data in one sector requires a sum of an average rotation waiting time of 0.5 rotations plus seek time. However, this is also slow compared with the speed of the bus to which a host computer and the hard disk drive are connected, so that the adoption of write-back caching can increase the speed of recording operations as viewed from the host computer.

As described earlier, history type read caching utilizes the fact that the more recently a block has been referred to, the more likely the block is to be referred to again. Read-ahead type read caching utilizes the fact that blocks lying ahead of a block that has been referred to are likely to be referred to. Since these two types of read caching are based on different facts, it is difficult to realize both types of read caching. Even if both types of read caching are achieved, there is a problem in that one type of read caching may hinder the performance of the other.

Moreover, if a recording is requested from a host computer while reproducing read-ahead cache data from the information recording medium, the recording operation must wait until the completion of the reproduction of the read-ahead cache data, since the data to be recorded is to be treated as history cache data, which cannot be managed in common with read-ahead cache data.

There is also a problem in that, when a reproduction is requested from a host computer while recording is performed on the information recording medium by the write-back caching technique, the reading of the reauested data, even if present in the cache data, must wait until the completion of the recording on the information recording medium.

There is also a problem in that, although the write-back caching technique improves the speed of the recording operation as viewed from the host computer, the amount of time required for the actual recording on the information recording medium is not reduced.

SUMMARY OF THE INVENTION

The information recording and reproducing apparatus according to the present invention is connected to a host device, and includes: drive means for recording data in blocks on a disk-shaped recording medium and reproducing data from the blocks of the disk-shaped recording medium; a record merge buffer for storing data present in those of the blocks for which recording is requested by the host device; write-back means for, when the data in the blocks for which recording is requested is stored in the record merge buffer, reporting to the host device that a recording operation of the drive means to record the data on the recording medium is complete and successively performing the recording operation; and, write-merge means for, when a block corresponding to new data that is requested by the host device to be recorded is continuous with the block corresponding to data being recorded on the recording medium, storing the new data in the record merge buffer, while continuing the recording operation, in such a way that the new data is continuous with the data being recorded, and ensuring that the drive means records the new data and the data being recorded on the recording medium during the same recording operation.

Alternatively, the method of data caching for an information recording and reproducing apparatus for recording data in blocks on a disk-shaped recording medium and reproducing data from the blocks of the disk-shaped recording medium according to the present invention, the information recording and reproducing apparatus being connected to a host device, includes: (a) a step for storing data present in those of the blocks for which recording is requested by the host device in a record merge buffer; (b) a write-back step for, when the data in the blocks for which recording is requested is stored in the record merge buffer, reporting to the host device that a recording operation of the drive means to record the data on the recording medium is complete and successively performing the recording operation; and, (c) a write-merge step for, when a block corresponding to new data that is requested by the host device to be recorded is continuous with the block corresponding to data being recorded on the recording medium, storing the new data in the record merge buffer, while continuing the recording operation, in such a way that the new data is continuous with the data being recorded, and recording the new data and the data being recorded on the recording medium during the same recording operation.

Thus, the invention described herein makes possible the advantages of (1) providing an information recording and reproducing apparatus and a method of data caching which make it possible to universally manage both the history data and the read-ahead data so as to be centered around the last block for which reproduction has been requested by a host device; (2) providing an information recording and reproducing apparatus and a method of data caching which makes it possible to immediately start a recording operation even if recording is requested by the host device during a read-ahead operation, so that both data reproduced from an information recording medium and data to be recorded, which is transmitted from the host device, are utilized as read cache data; (3) providing an information recording and reproducing apparatus and a method of data caching which make it possible to perform a recording operation for an information recording medium and a reproduction operation for the host device in parallel; and (4) providing an information recording and reproducing apparatus and a method of data caching which can improve the speed of the recording operation for the information recording medium itself when sequential recording requests or recording requests localizing around a certain block or more are made by the host device.

These and other advantages of the present invention will become apparent to those skilled in the art upon reading and understanding the following detailed description with reference to the accompanying figures.

DESCRIPTION OF THE PREFERRED EMBODIMENTS

FIGS. 3A and 3B are conceptual diagrams showing the ring buffer management according to Examples 1, 2, and 3 of the present invention.

FIG. 4 is a flowchart showing a method of data caching according to Example 1 of the present invention.

FIGS. 5A to 5D are conceptual diagrams for describing a data caching operation according to Example 1 of the present invention.

FIGS. 7A to 7D are conceptual diagrams for describing a data caching operation according to Example 2 of the present invention.

FIG. 8 is a flowchart showing a method of data caching according to Example 3 of the present invention.

FIGS. 9A and 9B are conceptual diagrams for describing a data caching operation according to Example 3 of the present invention.

FIGS. 13A to 13C are conceptual diagrams for describing a data caching operation according to Example 4 of the present invention.

DESCRIPTION OF THE PREFERRED EMBODIMENTS

Hereinafter, the information recording and reproducing apparatus and the method of data caching according to the present invention will be described by way of examples, with reference to the accompanying figures.

EXAMPLE 1

Figure 1:
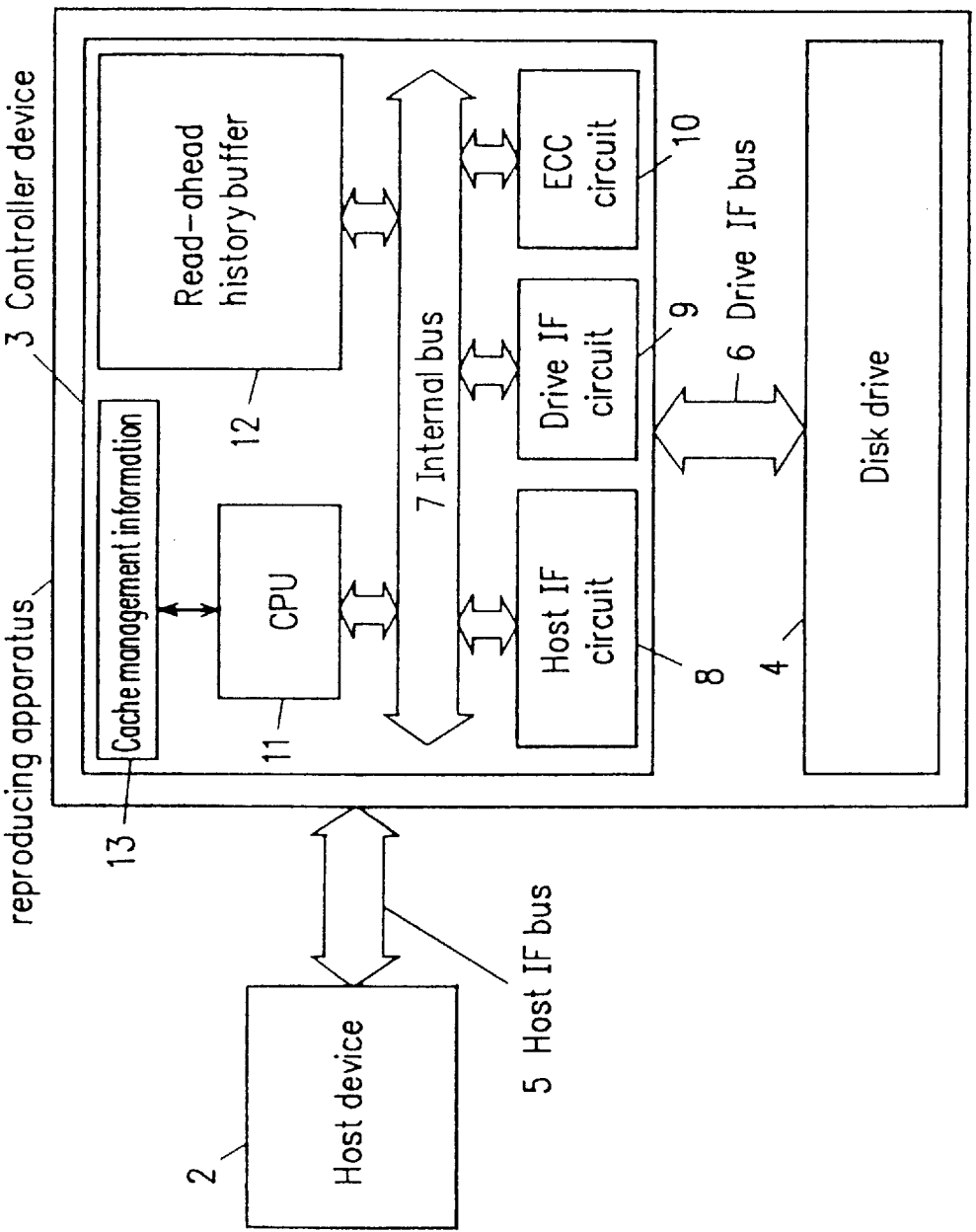
FIG. 1 is a diagram showing the configuration of an information recording and reproducing apparatus according to Examples 1, 2, and 3 of the present invention.

FIG. 1 is a view showing the configuration of an information recording and reproducing apparatus according to Examples 1, 2, and 3 of the present invention. In FIG. 1, reference numeral 1 denotes an information recording and reproducing apparatus; 2 denotes a host device; 3 denotes a controller device; 4 denotes a disk drive; 5 denotes a host IF bus; 6 denotes a drive IF bus; 7 denotes an internal bus; 8 denotes a host IF circuit; 9 denotes a drive IF circuit; 10 denotes an ECC circuit; 11 denotes a CPU; 12 denotes a read-ahead history buffer; and 13 denotes cache management information. The information recording and reproducing apparatus 1 is connected to the host device 2 via the host IF bus 5, which is a bus of a host interface such as a SCSI interface. The information recording and reproducing apparatus 1 is composed essentially of the controller device 3 and the disk drive 4. In accordance with an instruction from the host device 2, the information recording and reproducing apparatus 1 performs a recording or reproduction operation for an information recording medium (not shown) in the disk drive 4, under the control of the controller device 3. The controller device 3 is connected to the disk drive 4 via the drive IF bus 6, which is a bus of a drive interface such as ESDI. The controller device 3 is composed essentially of the host IF circuit 8, the drive IF circuit 9, the ECC circuit 10, the CPU 11, the read-ahead history 12, and the cache management information 13. The host IF circuit 8, the drive IF circuit 9, the ECC circuit 10, the CPU 11, and the read-ahead history 12 are interconnected via the internal bus 7. The CPU 11 controls the host IF bus 5 by using the host IF circuit 8 in accordance with a program stored therein, controls the drive IF bus 6 by using the drive IF circuit 9, performs error correction by using the ECC circuit 10, and manages data stored in the read-ahead history buffer 12 as cache data by using the cache management information 13.

Figure 2:
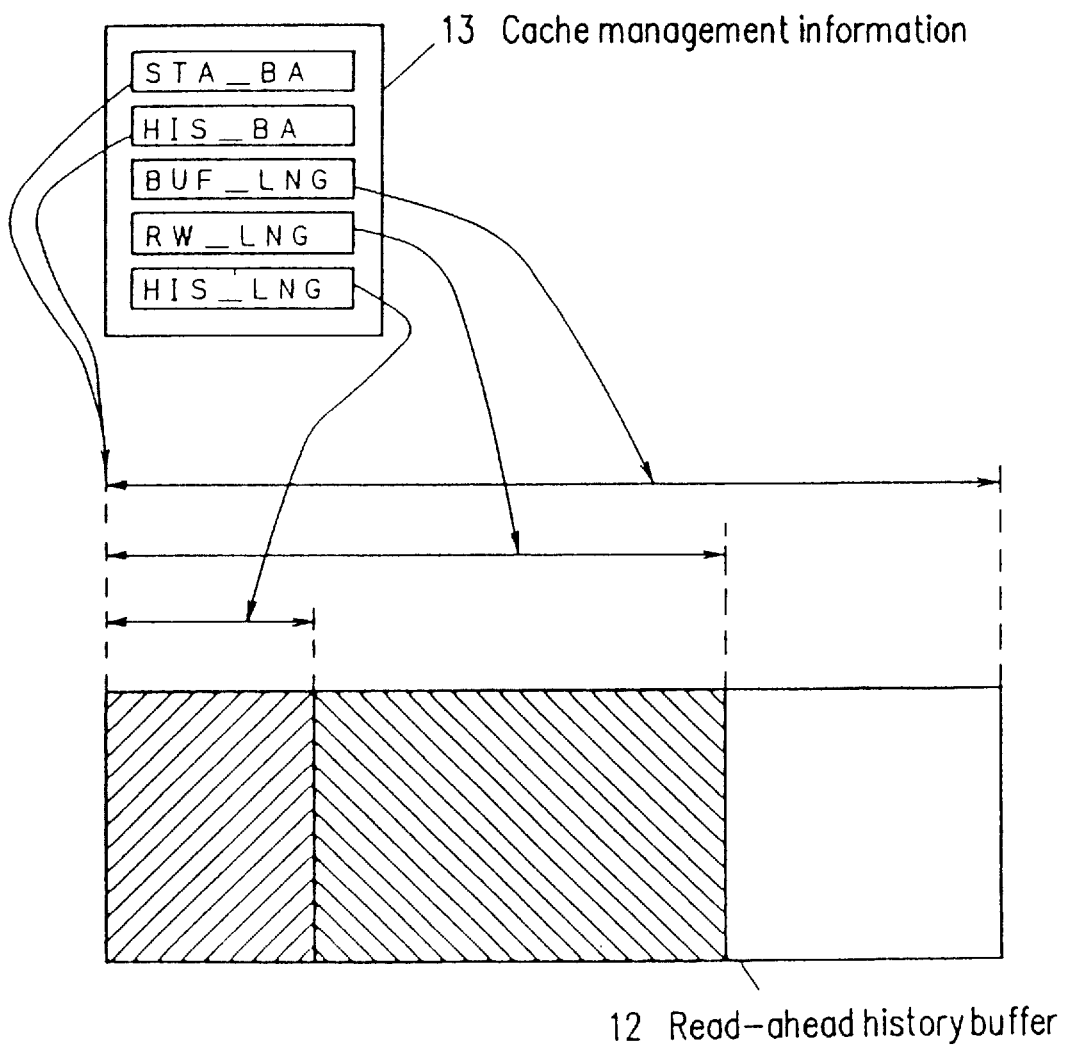
FIG. 2 is a conceptual diagram showing the cache management according to Examples 1, 2, and 3 of the present invention.

FIG. 2 is a conceptual diagram showing the cache management according to Examples 1, 2, and 3 of the present invention. FIG. 2 is employed in order to describe how the CPU 11 manages data stored in the read-ahead history buffer 12 as cache data by using the cache management information 13.

The cache management information 13 includes STA_BA, HIS_BA, BUF_LNG, RW_LNG, and HIS_LNG. STA_BA represents a position on an information recording medium corresponding to a block which is first stored in the read-ahead history buffer 12. HIS_BA represents a position on the information recording medium corresponding to the first block of history data that is not destroyed by read-ahead data. BUF_LNG represents the total capacity of the read-ahead history buffer 12 in terms of blocks. RW_LNG represents the number of blocks read from the information recording medium as counted from STA_BA. HIS_LNG represents the number of blocks from STA_BA to the last block requested by the host device. The region of the read-ahead history buffer 12 that is shaded with slanted lines (rising from bottom left to top right) represents history data. The region of the read-ahead history buffer 12 that is shaded with slanted lines (rising from bottom r4ght to top left) represents read-ahead data. The top position of the read-ahead data is derived to be HIS_BA+HIS_LNG. The number of blocks of the read-ahead data is derived to be RW_LNG-HIS_LNG. In the case where the read-ahead history buffer 12 has not been used by more than one cycle as a ring buffer, the top position of the history data equals STA_BA, and the number of blocks of the history data is HIS_LNG.

FIGS. 3A and 3B are conceptual diagrams showing the ring buffer management according to Examples 1, 2, and 3 of the present invention. FIGS. 3A and 3B are employed in order to describe the management of cache data in the case where the read-ahead history buffer 12 is utilized as a ring buffer. As shown in FIG. 3A, the read-ahead history buffer 12 functions as a ring-like buffer, with the last end thereof being logically turned back to the top end thereof. The last block requested by the host device 2 is STA_BA+HIS_LNG. The portion lying backward with respect to this boundary corresponds to the history data. The portion lying forward with respect to this boundary corresponds to the read-ahead data. FIG. 3B shows an extended view of the ring-like read-ahead history buffer 12. When the total number of blocks RW_LNG read from the information recording medium exceeds the total number of blocks BUF_LNG of the read-ahead history buffer 12, a portion of the history data is overwritten by the read-ahead data. When the read-ahead history buffer 12 is extended out as shown in FIG. 3B, the position in which the last block read from the information recording medium is stored is derived to be a remainder obtained by dividing RW_LNG by BUF_LNG. (A remainder resulting from dividing X by Y is represented as "X%Y".) The same applies to HIS_LNG. Moreover, HIS_BA, which represents the position of the first block of the remaining history data, is the larger one of (STA_BA) and (STA_BA+RW_LNG-BUF_LNG). (The larger one of two values X and Y is represented as "Max (X,Y)".) Accordingly, the history data is from HIS_BA to STA_BA+HIS_LNG, and the read-ahead data is from STA_BA+HIS_LNG to STA_BA+RW_LNG.

FIG. 4 is a flowchart showing a method of data caching according to Example 1 of the present invention. An operation will be described in which, when the host device 2 requests a reproduction operation to the information recording and reproducing apparatus 1, the history data and the read-ahead data are managed so as to be centered around the last block that has been requested to be read, and a predetermined amount (i.e., a half of the total capacity of the read-ahead history buffer 12 in this example) of read-ahead data is retained. The position of the first block for which reproduction has been requested by the host device 2 is defined as REQ_BA. The number of blocks is defined as REQ_LNG.

(Step D1) First, if the first block for which reproduction has been requested by the host device 2 is cached (i.e., "hit"), the control proceeds to Step D2. If not, the control proceeds to Step D5. The condition describing that the above-mentioned first block is cached is HIS_BA≦REQ_BA<STA_BA+RW_LNG.

(Step D2) A number of blocks that are required for maintaining the read-ahead data at a predetermined amount is derived. The number ADD_LNG of blocks to be additionally read is a value obtained by subtracting the last block (STA_BA+HIS_LNG) for which reproduction was previously requested by the host device 2 from the last block (REQ_BA+REQ_LNG) for which reproduction has been requested by the host device 2.

(Step D3) If additional reading from the information recording medium is necessary in order to maintain the read-ahead data at the predetermined amount, the control proceeds to Step D4. If not, the control proceeds to Step D7. The condition describing that additional reading is necessary is the number ADD_LNG of blocks to be additionally read>0.

(Step D4) The cache management is updated as necessitated by the additional reading from the information recording medium. As a result, the new RW_LNG equals RW_LNG+ADD_LNG, whereas the new HIS_LNG equals HIS_LNG+ADD_LNG. Moreover, HIS_BA is the larger one of (STA_BA) and (STA_BA+RW_LNG-BUF_LNG).

(Step D5) The cache management information is initialized so as to read-ahead the predetermined amount (i.e., half of the total capacity of the read-ahead history buffer 12) starting from the block for which reproduction has been requested. As a result, STA_BA equals REQ_BA. ADD_LNG and RW_LNG both equal REQ_LNG+BUF_LNG/2. HIS_LNG equals REQ_LNG. HIS_BA equals the larger one of (STA_BA) and (STA_BA+RW_LNG−BUF_LNG).

(Step D6) Data is additionally read from the information recording medium into the read-ahead history buffer 12.

(Step D7) The data of the block for which reproduction has been requested is transmitted to the host device 2.

In the flowchart of FIG. 4, Steps D6 and D7 are not simultaneously performed. However, it is possible to perform the reading from the information recording medium and the transfer of data to the host device 2 in parallel by a time sharing method.

FIGS. 5A to 5D are conceptual diagrams for describing a data caching operation according to Example 1 of the present invention. FIG. 5A describes a state where, when a block for which reproduction has been requested by the host device 2 mis-hits the cache data, the cache management information 13 is initialized, so that the reproduced data is stored in the read-ahead history buffer 12. FIG. 5B describes a state where reproduction of both history data and read-ahead data has been requested from the host device 2. In this case, the cache management information is updated so that data up to the block for which reproduction has been requested is managed as history data, and the data additionally read from the information recording medium is stored in the read-ahead history buffer 12. FIG. 5C describes a state where the host device 2 requests reproduction of the history data alone in the state shown in FIG. 5B, so that the cache management information 13 is not updated, i.e., no additional reading from thie information recording medium is performed, thereby leaving the read-ahead history buffer 12 in the state shown in FIG. 5B. Accordingly, the state of the read-ahead history buffer 12 is the same in FIGS. 5B and 5C. FIG. 5D describes a state where the host device 2 requests reproduction of the read-ahead data alone in the state shown in FIG. 5C, so that the cache management information 13 is updated, thereby ensuring that the data additionally read from the information recording medium is turned back in a ring-like manner so as to overwrite a portion of the history data. In FIG. 5D, the history data located on the left of HIS_BA becomes null.

As described above, according to the present example, it is possible to universally manage both the history data and the read-ahead data so as to be centered around the last block for which reproduction has been requested by the host device 2. It is also possible to maintain the read-ahead data at a predetermined amount.

In the present example, the amount of the read-ahead data is maintained at half the total capacity of the read-ahead history buffer 12. However, the amount of the read-ahead data is not limited thereto. For example, the amount of the read-ahead data may be maintained at a value obtained by dividing the total capacitance of the read-ahead history buffer 12 by an integer. Alternatively, the amount of the read-ahead data may be maintained at an amount corresponding to a multiple of the sectors present in one rotation of the information recording medium.

EXAMPLE 2

Figure 6:
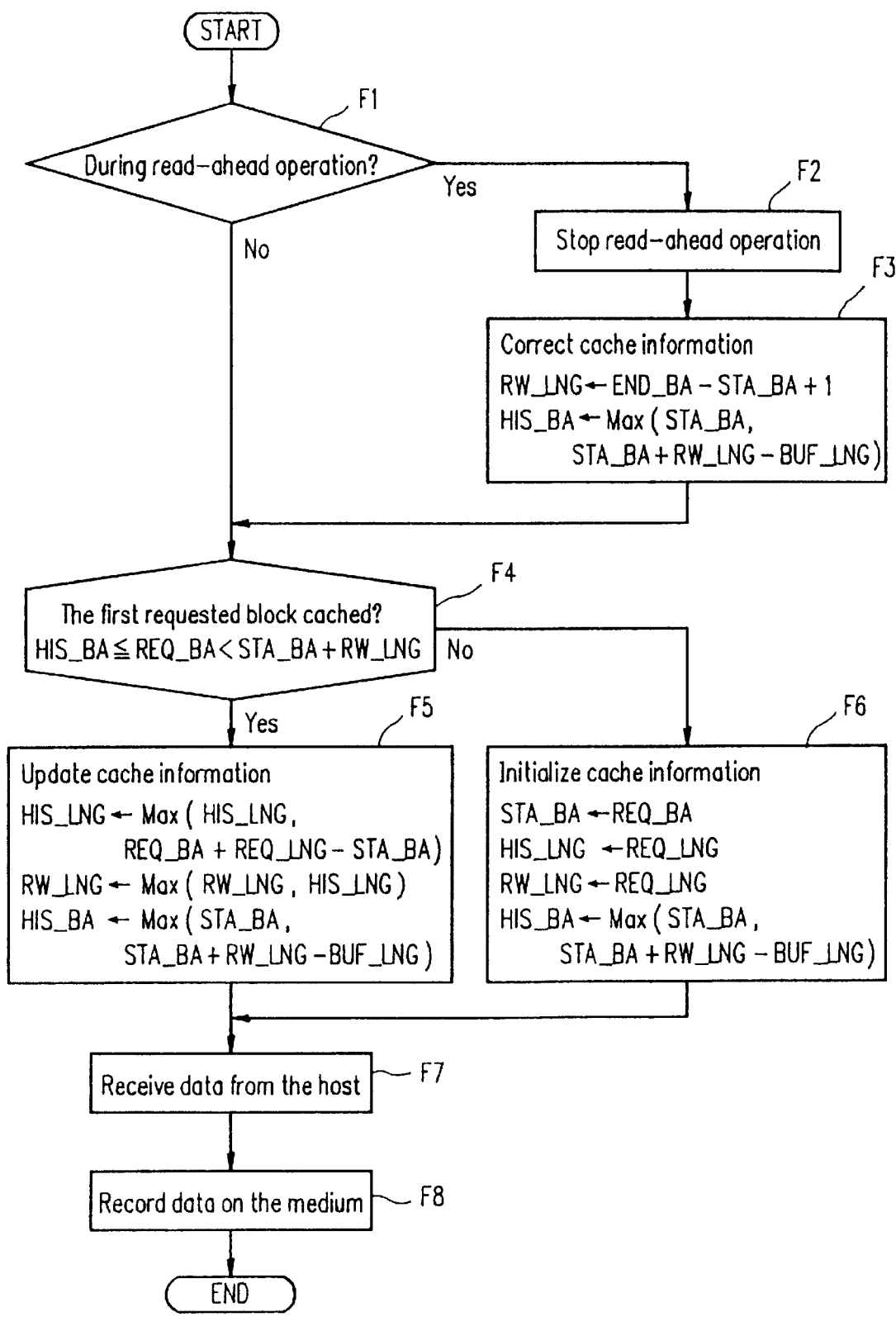
FIG. 6 is a flowchart showing a method of data caching according to Example 2 of the present invention.

FIG. 6 is a flowchart showing a method of data caching according to Example 2 of the present invention. An operation will be described in which a recording operation is immediately started even if recording is requested by the host device 2 during a read-ahead operation, and both data reproduced from an information recording medium and data to be recorded, which is transmitted from the host device 2, are utilized as read cache data. The position of the first block for which recording has been requested by the host device 2 is defined as REQ_BA. The number of blocks is defined as REQ_LNG. Moreover, it is assumed that the position END_BA of a block last read from the information recording medium is derived by the drive IF circuit 9.

(Step F1) When a recording is requested from the host device 2, it is confirmed whether or not a read-ahead operation is being performed. If read-ahead data is being reproduced from the information recording medium, the control proceeds to Step F2. If not, the control proceeds to Step F4.

(Step F2) The read-ahead operation from the information recording medium is stopped.

(Step F3) In accordance with the cancellation of the read-ahead operation, the cache management information 13 is changed. The total number RW_LNG of blocks read from the information recording medium is changed to a value obtained by adding 1 to the difference between the position END_BA of the last read (reproduced) block and the position STA_BA of the first read (reproduced) block. Moreover, HIS_BA is changed to be the larger one of (STA_BA) and (STA_BA+RW_LNG−BUF_LNG).

(Step F4) It is confirmed whether or not the first block for which recording has been requested by the host device 2 is cached. If the first block for which recording has been requested by the host device 2 is cached, the control proceeds to Step F5. If not, the control proceeds to Step F6. The condition describing that the above-mentioned first block is cached is HIS_BA<REQ_BA<STA_BA+RW_LNG.

(Step F5) The cache management information 13 is updated in such a manner that the data to be recorded is added as history data to the cache data which already exists. As a result, HIS_LNG equals the larger one of (HIS_LNG) and (REQ_BA−REQ_LNG+STA_BA). RW_LNG equals the larger one of (RW_LNG) and (REQ_BA−REQ_LNG+STA_BA). HIS_BA equals the larger one of (STA_BA) and (STA_BA+RW_LNG−BUF_LNG).

(Step F6) The already existing cache data is discarded and the cache management information 13 is initialized in such a manner that the data to be recorded becomes history data. Thus, STA_BA equals REQ_BA. Moreover, HIS_LNG and RW_LNG both equal REQ_LNG. HIS_BA equals the larger one of (STA_BA) and (STA_BA+RW_LNG BUF_LNG).

(Step F7) The data to be recorded from the host device 2 is received and stored in the read-ahead history buffer 12.

(Step F8) The received data to be recorded from the host device 2 is recorded on the information recording medium.

FIGS. 7A to 7D are conceptual diagrams for describing a data caching operation according to Example 2 of the present invention. FIG. 7A describes a state where reproduction has previously been requested by the host device 2, so that history data and read-ahead data are stored in the read-ahead history buffer 12. FIG. 7B describes a state where, when data corresponding to both the history data and the read-ahead data is requested to be recorded by the host device 2 in the state shown in FIG. 7A, the cache data already existing is updated to include the data to be recorded as history data. FIG. 7C describes the same state as that shown in FIG. 7A. FIG. 7D describes a state where, when a recording exceeding the read-ahead data is requested by the host device 2 in the state shown in FIG. 7C, the data to be recorded has updated the cache data already existing, as history data.

As described above, according to the present example, a recording operation is immediately started even if recording is requested by the host device 2 during a read-ahead operation, and both data reproduced from an information recording medium and data to be recorded, which is transmitted from the host device 2, are utilized as read cache data.

EXAMPLE 3

FIG. 8 is a flowchart showing a method of data caching according to Example 3 of the present invention. An operation will be described in which, when a reproduction is requested by the host device 2 while the disk drive 4 is performing a recording operation on the information recording medium, the recording operation for the information recording medium and a reproduction operation for the host device 2 are performed in parallel. In other words, the transfer of the requested data from the read-ahead history buffer 12 to the host device 2 and the transfer of data from the read-ahead history buffer 12 to the information recording medium are carried out in parallel. It is assumed that the recording operation for the information recording medium is performed by the write-back cache method. The position of the first block for which reproduction has been requested by the host device 2 is defined as REQ_BA. The number of blocks is defined as REQ_LNG.

(Step H1) It is confirmed whether or not the disk drive 4 is performing a recording operation on the information recording medium. If a recording operation is being performed for the information recording medium by the write-back cache method, the control proceeds to Step H2. If not, the control proceeds to other processes (e.g., the processes shown in FIG. 4).

(Step H2) If all the data in the block for which reproduction has been requested by the host device 2 exists in the cache data (described as a "perfect hit"), the control proceeds to Step H3. If not, the control proceeds to Step H5. The condition describing a perfect hit is REQ_BA≧HIS_BA and REQ_BA+REQ_LNG≦STA_BA+RW_LNG.

(Step H3) The cache management information 13 is updated so as to treat the region which has been "perfectly hit" as history data. As a result, HIS_LNG equals the larger one of (HIS_LNG) and (REQ_BA+REQ_LNG STA_BA). RW_LNG equals the larger one of (RW_LNG) and (HIS_LNG). HIS_BA equals the larger one of (STA_BA) and (STA_BA+RW_LNG−BUF_LNG).

(Step H4) The data of the block which has been requested to be read is transmitted to the host device 2.

(Step H5) The control waits until the recording on the information recording medium is complete.

Thus, according to the present invention, if the data for requested by the host device 2 to be reproduced is "perfectly hit", the recording on the information recording medium, i.e., the transfer of data from the read-ahead history buffer 12 to the information recording medium and the transfer of the requested data from the read-ahead history buffer 12 to the host device 2 are performed in parallel.

FIGS. 9A and 9B are conceptual diagrams for describing a data caching operation according to Example 3 of the present invention. FIG. 9A describes a state where reproduction has previously been requested by the host device 2 so that history data and read-ahead data are stored in the read-ahead history buffer 12, and thereafter recording is requested for a region which is only included in the history data, so that recording is being performed for the information recording medium. FIG. 9B describes a state where, when reproduction is requested for data corresponding to both the history data (including the data being recorded on the information recording medium) and the read-ahead data by the host device 2 in the state show in FIG. 9A, the data requested to be reproduced is managed as history data.

As described above, according to the present example, when a reproduction is requested by the host device 2 while the disk drive 4 is performing a recording operation on the information recording medium, the recording operation for the information recording medium and a reproduction operation for the host device 2 are performed in parallel.

EXAMPLE 4

Hereinafter, a method of data caching will be described which not only improves the speed of recording/reproduction operation as viewed from the computer but also improves the speed of the recording operation for an information recording medium itself. This concept will be further elaborated below.

A disk-shaped information recording medium differs from a semiconductor memory in that quite different amounts of time (access time) are required to access different positions of a disk-shaped information recording medium. As described earlier in the Description of the Related Art, when an OS or an application which works on a computer tries to read out a file, it does not request the entire file to be reproduced, but sequentially requests smaller units of the file, beginning from the top of the file. Such accesses are referred to as sequential accesses. Sequential accesses are also made when data is written in one file.

Figure 19:
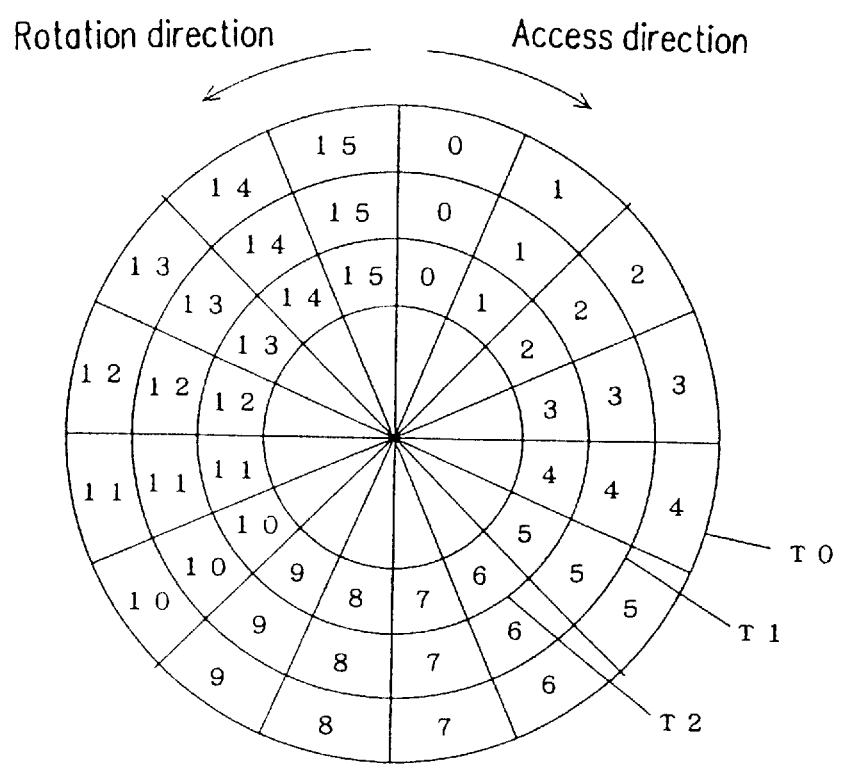
FIG. 19 is a view showing a layout of a disk-shaped information recording medium.
Figure 20:
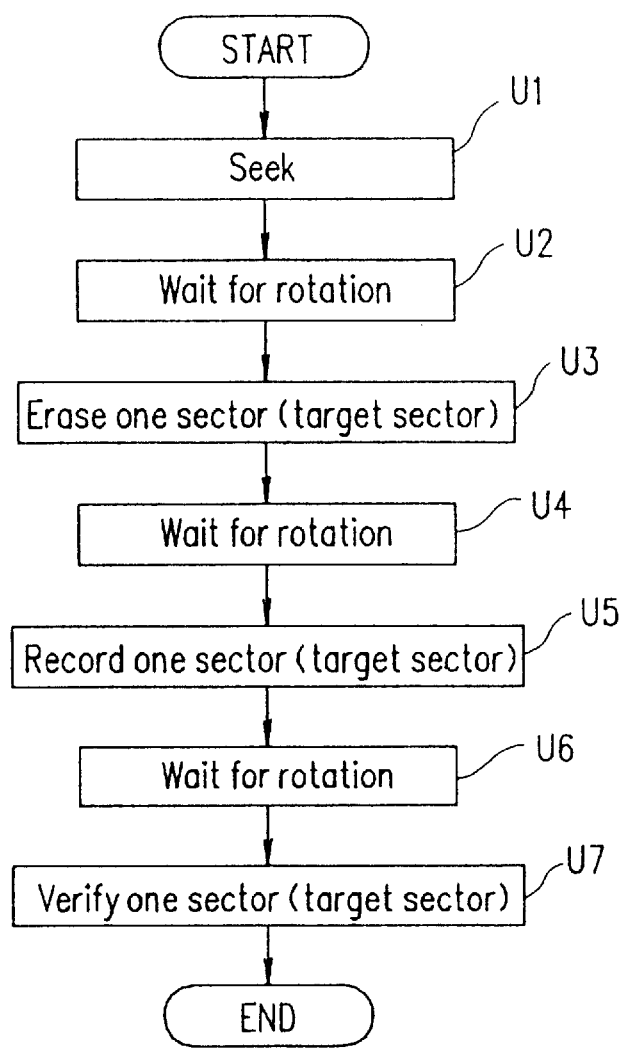
FIG. 20 is a flowchart showing a recording operation of an optical disk drive.

For example, in the conceptual diagram shown in FIG. 19, sectors 0 to 9 of track T1 may constitute one file. In this case, recording requests are sequentially made, in a sector-by-sector manner, for sectors 0 to 9 in this order. The amount of time required to complete the writing of the file is derived, based on the recording operation for an optical disk drive described with reference to FIG. 20, to be at least 30 rotations (=3 rotations×10 sectors). This value is 10 times larger than 3 rotations, which is the amount of time that would be required in the case where data was written in all of sectors 0 to 9 at the same time. This ratio of 10 to 1 also holds in the case of a hard disk drive. In other words, if recording requests made in sequential accesses can be converted into one recording request, the speed of the recording process for the information recording medium itself can be improved.

Figure 10:
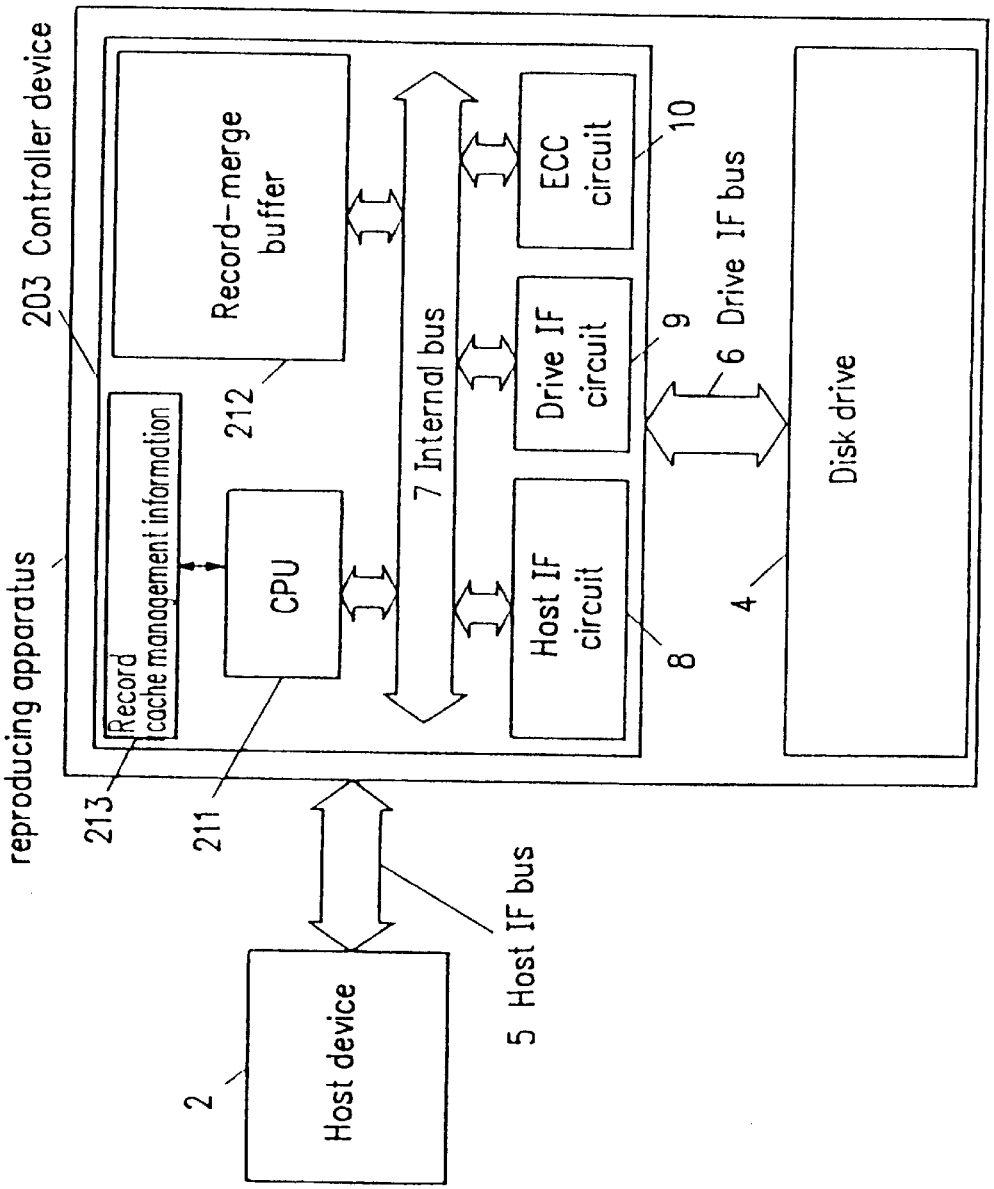
FIG. 10 is a diagram showing the configuration of an information recording and reproducing apparatus according to Examples 4 and 5 of the present invention.

FIG. 10 is a diagram showing the configuration of an information recording and reproducing apparatus according to Examples 4 and 5 of the present invention. In FIG. 10, constituent elements which also appear in FIG. 1 are indicated by the same reference numerals as used therein, and the descriptions thereof are omitted. In FIG. 10, reference numeral 201 denotes an information recording and reproducing apparatus; 203 denotes a controller device; 211 denotes a CPU; 212 denotes a record merge buffer; and 213 denotes record cache management information. The CPU 211 controls a host IF bus 5 by using a host IF circuit 8 in accordance with a program stored therein, controls a drive IF bus 6 by using a drive IF circuit 9, performs error correction by using an ECC circuit 10, and manages data stored in the record merge buffer 212 as cache data by using the record cache management information 213.

Figure 11:
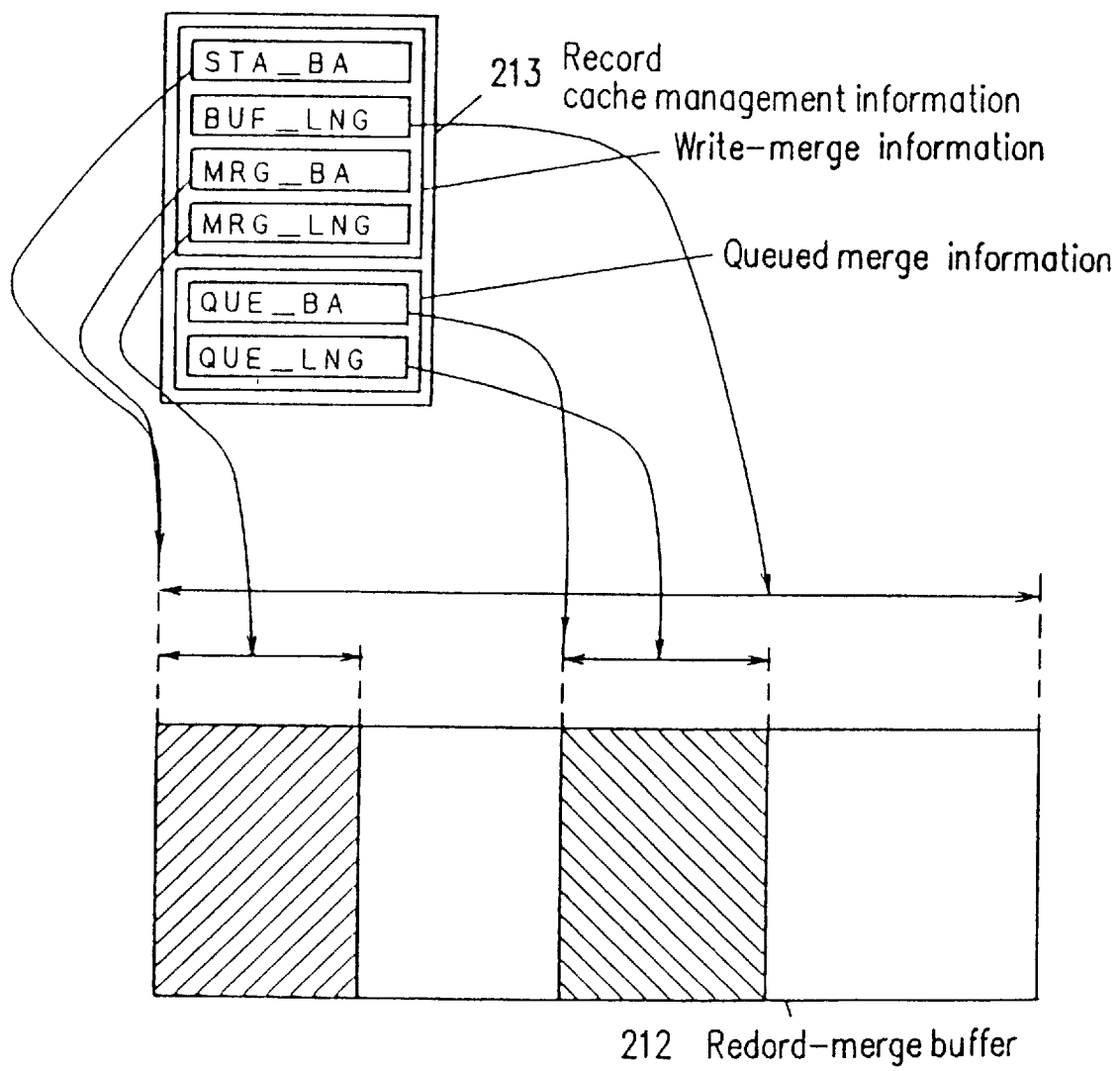
FIG. 11 is a conceptual diagram showing the cache management according to Examples 4 and 5 of the present invention.

FIG. 11 is a conceptual diagram showing the cache management according to Examples 4 and 5 of the present invention. FIG. 11 is employed to describe the management by the CPU 211, which manages data in the record merge buffer 212 as cache data by using the record cache management information 213. The record cache management information 213 includes STA_BA, BUF_LNG, MRG_BA, MRG_LNG, QUE_BA, and QUE_LNG. STA_BA represents a position on an information recording medium corresponding to a block which is first stored in the record merge buffer 212. BUF_LNG represents the total capacity of the record merge buffer 212 in terms of blocks. MRG_BA represents the position of the first block being recorded on the information recording medium. MRG_LNG represents the number of blocks being recorded on the information recording medium. QUE_BA represents the position of the first block which is queuing to be recorded on the information recording medium. QUE_LNG represents the number of blocks which are queuing to be recorded on the information recording medium. Herein, STA_BA, BUF_LNG, MRG_BA, and MRG_LNG are collectively referred to as "write-merge information", whereas QUE_BA and QUE_LNG are collectively referred to as "queued merge information". The region of the record merge buffer 212 that is shaded with slanted lines (rising from bottom left to top right) represents write-merge data. The region of the record merge buffer 212 that is shaded with slanted lines (rising from bottom right to top left) represents queued merge data.

Figure 12:
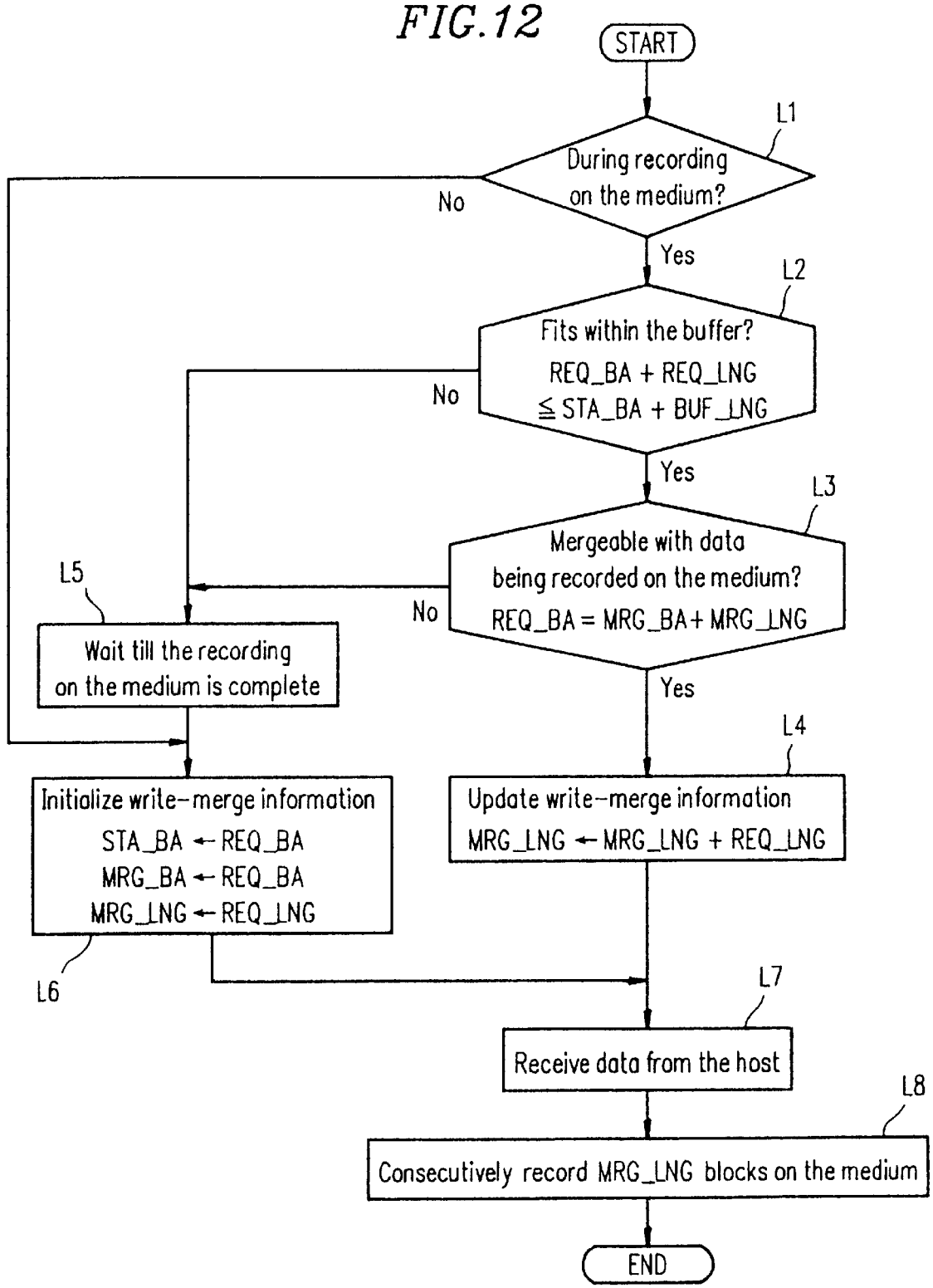
FIG. 12 is a flowchart showing a method of data caching according to Example 4 of the present invention.

FIG. 12 is a flowchart showing a method of data caching according to Example 4 of the present invention. An operation will be described in which, when a recording is requested from a host device 2 while a disk drive 4 is performing a recording operation on the information recording medium, a number of recording requests made in sequential accesses are merged into one recording operation which is performed for the information recording medium at one time. The recording operation for the information recording medium is assumed to be performed by the write-back cache method in the background. The position of the first block for which recording has been requested by the host device 2 is defined as REQ_BA, and the number of blocks is defined as REQ_LNG.

Figure 21:
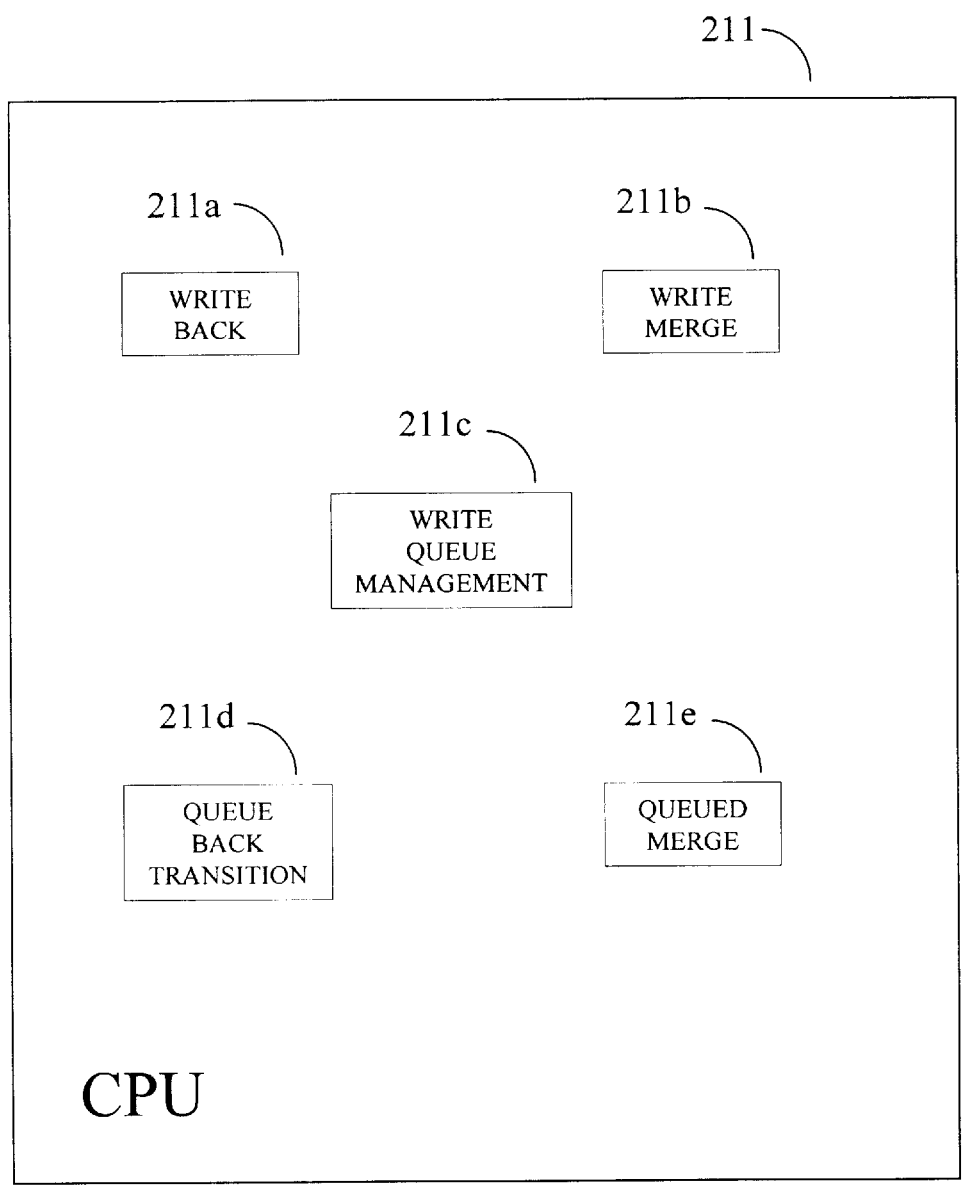
FIG. 21 is a block diagram showing process operating within the CPU shown in FIG. 10.

(Step L1) It is confirmed whether or not the disk drive 4 is performing a recording operation on the information recording medium by the write-back cache method. If a recording operation is being performed for the information recording medium by the write-back cache method, that is, a write-back mechanism 211a, illustrated in FIG. 21, has reported to the host device that a recording operation is complete and the recording operation is being successfully performed the control proceeds to Step L2. If not, the control proceeds to Step L6. The condition describing that a recording operation is being performed is MRG_LNG>0.

(Step L2) It is confirmed whether or not the data being recorded on the information recording medium and the data requested to be recorded by the host device 2 both fit within the record merge buffer 212. If both data fit within the record merge buffer 212, the control proceeds to Step L3. If not, the control proceeds to Step L5. The condition describing that both data fit within the record merge buffer 212 is REQ_BA+REQ_LNG≦STA_BA+BUF_LNG.

(Step L3) It is confirmed whether or not the data being recorded on the information recording medium and the data requested to be recorded by the host device 2 can be merged with each other. If the two data can be merged with each other, the control proceeds to Step L4. If not, the control proceeds to Step L5. The condition describing that the two data can be merged with each other is REQ_BA=MRG_BA+MRG_LNG.

(Step L4) The write-merge information is updated so that the data being recorded on the information recording medium and the data requested to be recorded by the host device 2 are merged with each other. In other words, when new data that is requested by the host device to be recorded is continuous with the data being recorded on the information recording medium, a write-merge mechanism 211b, illustrated in FIG. 21, stores the new data, while continuing the recording operation, in such a way that the new data is continuous with the data being recorded. This ensures that the new data and the data being recorded are recorded on the recording medium during the same recording operation. The number MRG_LNG of blocks being recorded on the information recording medium is increased by REQ_LNG.

(Step L5) The control waits until the recording on the information recording medium by the write-back cache method is complete.

(Step L6) The write-merge information is initialized so that the data requested to be recorded by the host device 2 becomes data being recorded on the information recording medium. As a result, STA_BA and MRG_BA both equal REQ_BA. Moreover, MRG_LNG equals REQ_LNG.

(Step L7) The data requested to be recorded by the host device 2 is received and stored in the record merge buffer 212 then the completion of the recording operation is reported to the host device 2. (Step L8) The data stored in the number MRG_LNG of blocks is consecutively recorded in the information recording medium.

FIGS. 13A to 13C are conceptual diagrams for describing a data caching operation according to Example 4 of the present invention. FIG. 13A describes a state where, when no recording operation is performed for the information recording medium, the host device 2 has made a recording request, so that the data to be recorded is stored in the record merge buffer 212. FIG. 13B shows a state where, the host device 2 has made sequential recording requests in the state shown in FIG. 13A, and the data currently requested to be recorded is merged with the data previously requested to be recorded so as to be stored in the record merge buffer 212. FIG. 13C describes a state where a further sequential recording request is made in the state shown in FIG. 13B. The processes shown in FIGS. 13A to 13C are performed during seek time or rotation waiting time, so that three requests are converted into one request.

As described above, according to the present example, when sequential recording requests are made by the host device 2, the recording requests are converted into a single recording request, whereby the speed of the recording operation for the information recording medium itself is improved. If the recording operation is completed in the interval between the previous host request and the next one, then MRG_LNG is set at zero in order to indicate that the write-merge data has been depleted.

EXAMPLE 5

Figure 14A:
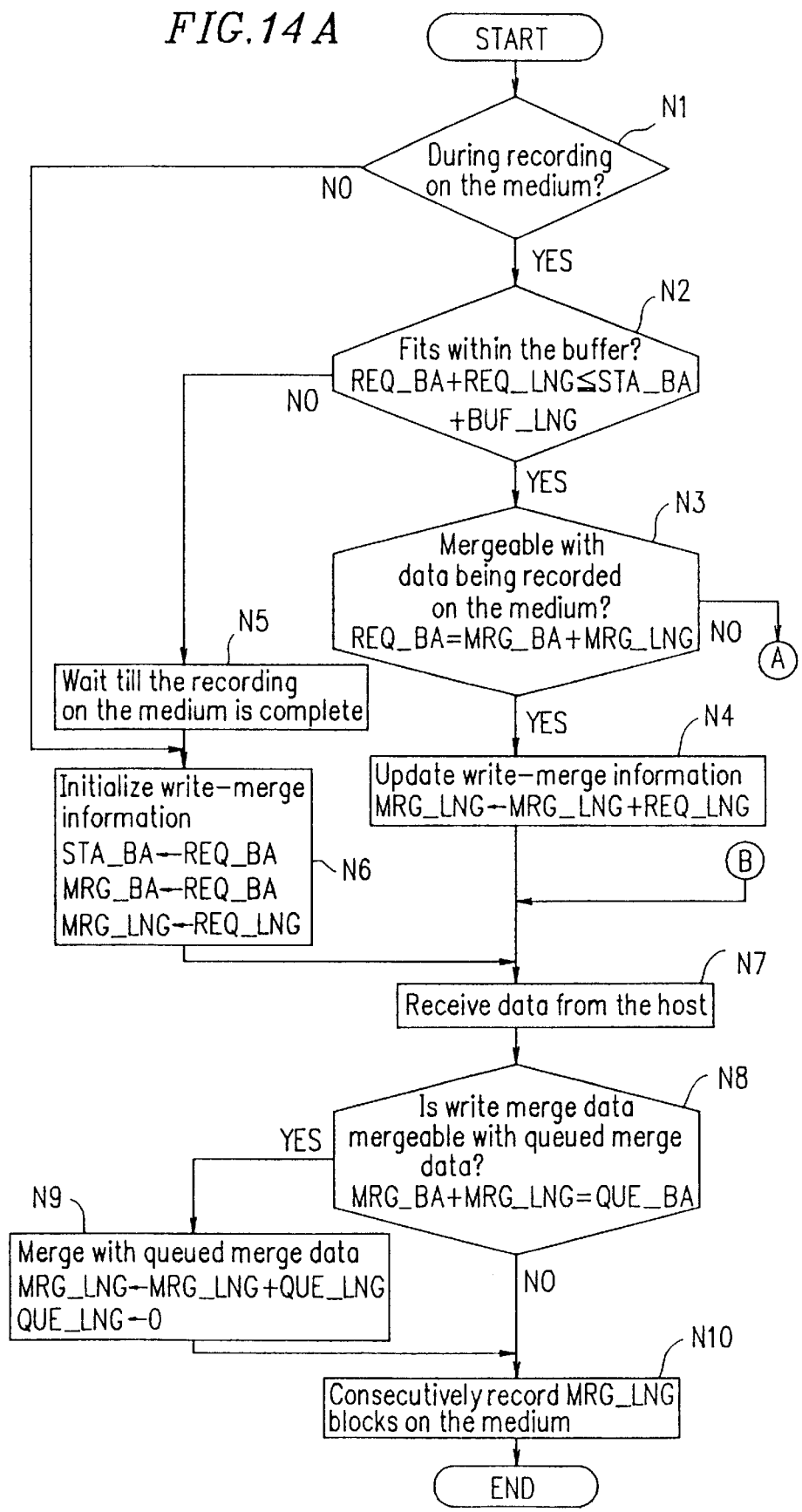
FIGS. 14A and 14B are flowcharts showing a method of data caching according to Example 5 of the present invention.
Figure 14B:
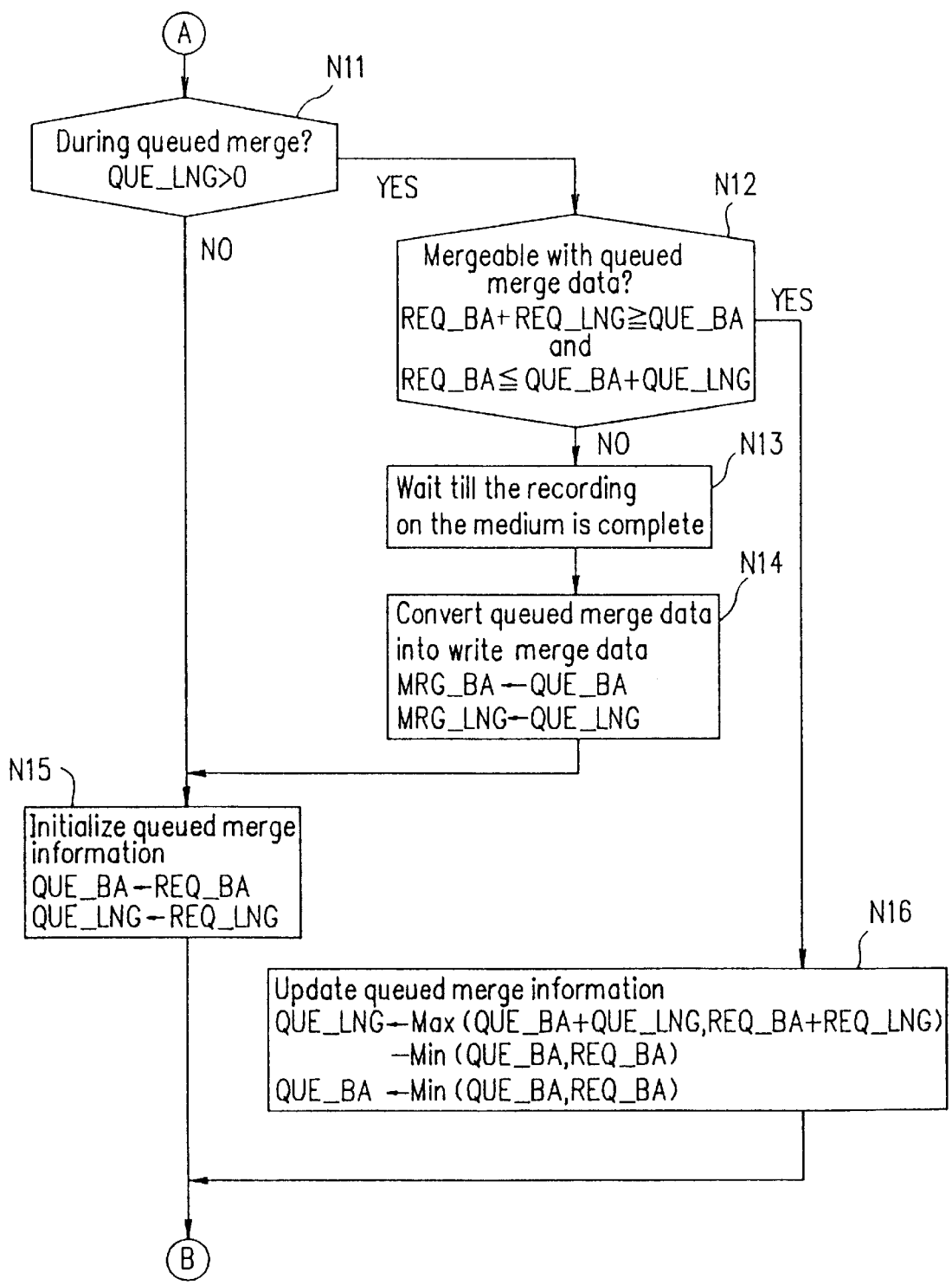

FIGS. 14A and 14B are flowcharts showing a method of data caching according to Example 5 of the present invention. An operation will be described which embodies a queuing structure in the method according to Example 4 so that accesses localizing around a certain block or more are merged into one recording operation for an information recording medium. The position of the first block for which recording has been requested by the host device 2 is defined as REQ_BA, and the number of blocks is defined as REQ_LNG.

(Step N1) It is confirmed whether or not the disk drive 4 is performing a recording operation on the information recording medium by the write-back cache method. If a recording operation is being performed for the information recording medium by the write-back cache method, the control proceeds to Step N2. If not, the control proceeds to Step N6. The condition describing that a recording operation is being performed is MRG_LNG>0.

(Step N2) It is confirmed whether or not the data being recorded on the information recording medium and the data requested to be recorded by the host device 2 both fit within the record merge buffer 212. If both data fit within the record merge buffer 212, the control proceeds to Step N3. If not, the control proceeds to Step N5. The condition describing that both data fit within the record merge buffer 212 is REQ_BA+REQ_LNG≦STA_BA+BUF_LNG.

(Step N3) It is confirmed whether or not the data being recorded on the information recording medium and the data requested to be recorded by the host device 2 can be merged with each other. If the two data can be merged with each other, the control proceeds to Step N4. If not, the control proceeds to Step N11. The condition describing that the two data can be merged with each other is REQ_BA=MRG_BA+MRG_LNG.

(Step N4) The write-merge information is updated so that the data being recorded on the information recording medium and the data requested to be recorded by the host device 2 are merged with each other. When new data requested by the host device to be recorded is not continuous with the data being recorded on the information recording medium, a write-queue management mechanism 211c stores the new data in the record merge buffer 212 as record-pending data in such a way that the new data is at a distance from the data being recorded on the information recording medium. The distance in the record merge buffer corresponds to a distance on the recording medium. In addition, when further new data requested to be recorded by the host device is continuous with the block corresponding to the record-pending data, a queued merge mechanism 211e stores the further new data in the record merge buffer 212 in such a way that the new data is continuous with the record-pending data. A queue back transition mechanism 211d ensures that the write-back mechanism 211a starts recording the record-pending data by the write-queue management mechanism 211c when the recording operation by the write-back mechanism 211a is complete. The number MRG_LNG of blocks being recorded on the information recording medium is increased by REQ_LNG.

(Step N5) The control waits until the recording on the information recording medium by the write-back cache method is complete.

(Step N6) The write-merge information is initialized so that the data requested to be recorded by the host device 2 becomes data being recorded on the information recording medium. As a result, STA_BA and MRG_BA both equal REQ_BA. Moreover, MRG_LNG equals REQ_LNG.

(Step N7) The data requested to be recorded by the host device 2 is received and stored in the record merge buffer 212, then the completion of the recording operation is the host device 2.

(Step N8) It is confirmed whether or not the data being recorded on the information recording medium and queued merge data can be merged with each other. If the two data can be merged with each other, the control proceeds to Step N9. If not, the control proceeds to Step N10. The condition describing that the two data can be merged with each other is MRG_BA+MRG_LNG=QUE_BA.

(Step N9) The data being recorded on the information recording medium is merged with the queued merge data. MRG_LNG is increased by QUE_LNG. QUE_LNG becomes zero in order to indicate that the queued merge data has been depleted.

(Step N10) The data stored in the number MRG_LNG of blocks is consecutively recorded in the information recording medium.

(Step N11) It is confirmed whether or not any queued merge data exists. If some queued merge data exists, the control proceeds to Step N12. If not, the control proceeds to Step N15. The condition describing that some queued merge data exists is QUE_LNG>0.

(Step N12) It is confirmed whether or not the data requested to be recorded by the host device 2 and the queued merge data can be merged with each other. If the two data can be merged with each other, the control proceeds to Step N16. If not, the control proceeds to Step N13. The condition describing that the two data can be merged with each other is REQ_BA+REQ_LNG≧QUE_BA and REQ_BA≦QUE_BA+QUE_LNG.

(Step N13) The control waits until the recording on the information recording medium by the write-back cache method is complete.

(Step N14) The queued merge data is converted into write-merge data. As a result, MRG_BA equals QUE_BA, and MRG_LNG equals QUE_LNG.

(Step N15) The queued merge information is initialized. As a result, QUE_BA equals REQ_BA, and QUE_LNG equals REQ_LNG.

(Step N16) The write-merge information is updated so that the queued data and the data requested by the host device 2 to be recorded are merged with each other. As a result, QUE_LNG equals a value obtained by subtracting {the smaller one of QUE_BA and REQ_BA} from {the larger one of (QUE_BA+QUE_LNG) and (REQ_BA+REQ_LNG)}. Moreover, QUE_BA equals the smaller one of QUE_BA and REQ_BA.

Figure 15A:
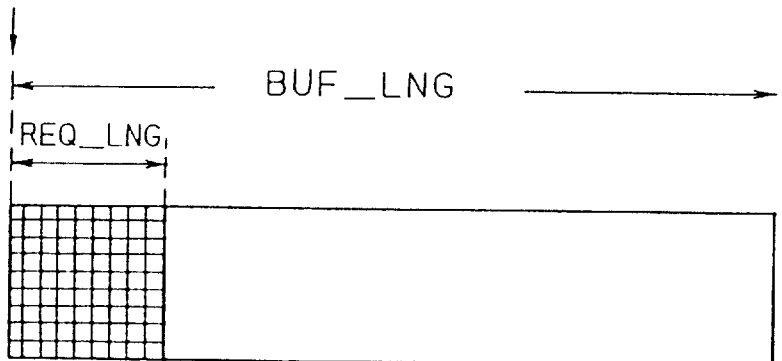
FIGS. 15A to 15D are conceptual diagrams for describing a data caching operation according to Example 5 of the present invention.
Figure 15B:
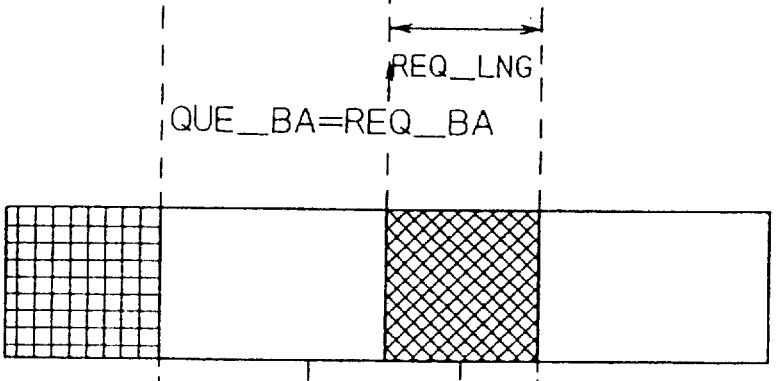
Figure 15C:
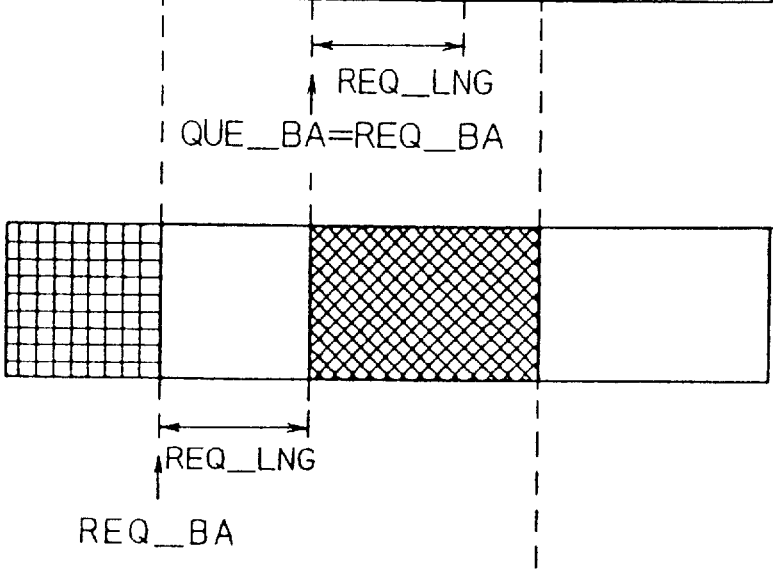
Figure 15D:
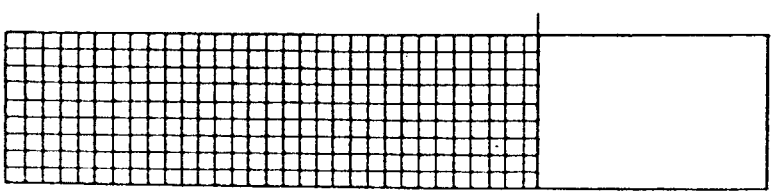

FIGS. 15A to 15D are conceptual diagrams for describing a data caching operation according to Example 5 of the present invention. FIG. 15A describes a state where, when no recording operation is performed for the information recording medium, the host device 2 has made a recording request, so that the data to be recorded is stored in the record merge buffer 212. FIG. 15B shows a state where, the host device 2 has made recording requests which are not sequential but can fit within the record merge buffer 212 in the state shown in FIG. 15A, and the data to be recorded is stored in the record merge buffer 212 as queued merge data. FIG. 15C describes a state where, in the case where the recording request from the host device 2 is mergeable with the queued merge data, the previous queued merge data and the data currently requested to be recorded are merged with each other so as to be stored in the record merge buffer 212. FIG. 15D describes a state where, a further recording request which fills in a gap between the write-merge data and the queued merge data has been made, the write-merge data, the data to be recorded, and the queued merge data are merged with one another so as to be stored in the record merge buffer 212. Accordingly, even if the recording requests are not completely sequential, the recording requests can be merged into one recording operation for the information recording medium as long as the requests concentrate in a certain block or more.

As described above, according to the present example, when recording requests localizing around a certain block or more are made by the host device 2, the recording requests can be converted into one recording request. As a result, the speed of the recording operation for the information recording medium itself can be improved. Although a single queued merge structure (i.e.,, a structure including only one stage of queued merge data) is described above, it is also easy to construct a multiple queued merge structure (i.e., a structure including multiple stages of queued merge data.) If the recording operation is completed in the interval between the previous host request and the next one, the control starts from Step N14 in case of some queued merge data existing, and MRG_LNG is set at zero in case of no queued merge data existing.

EXAMPLE 6

Figure 16:
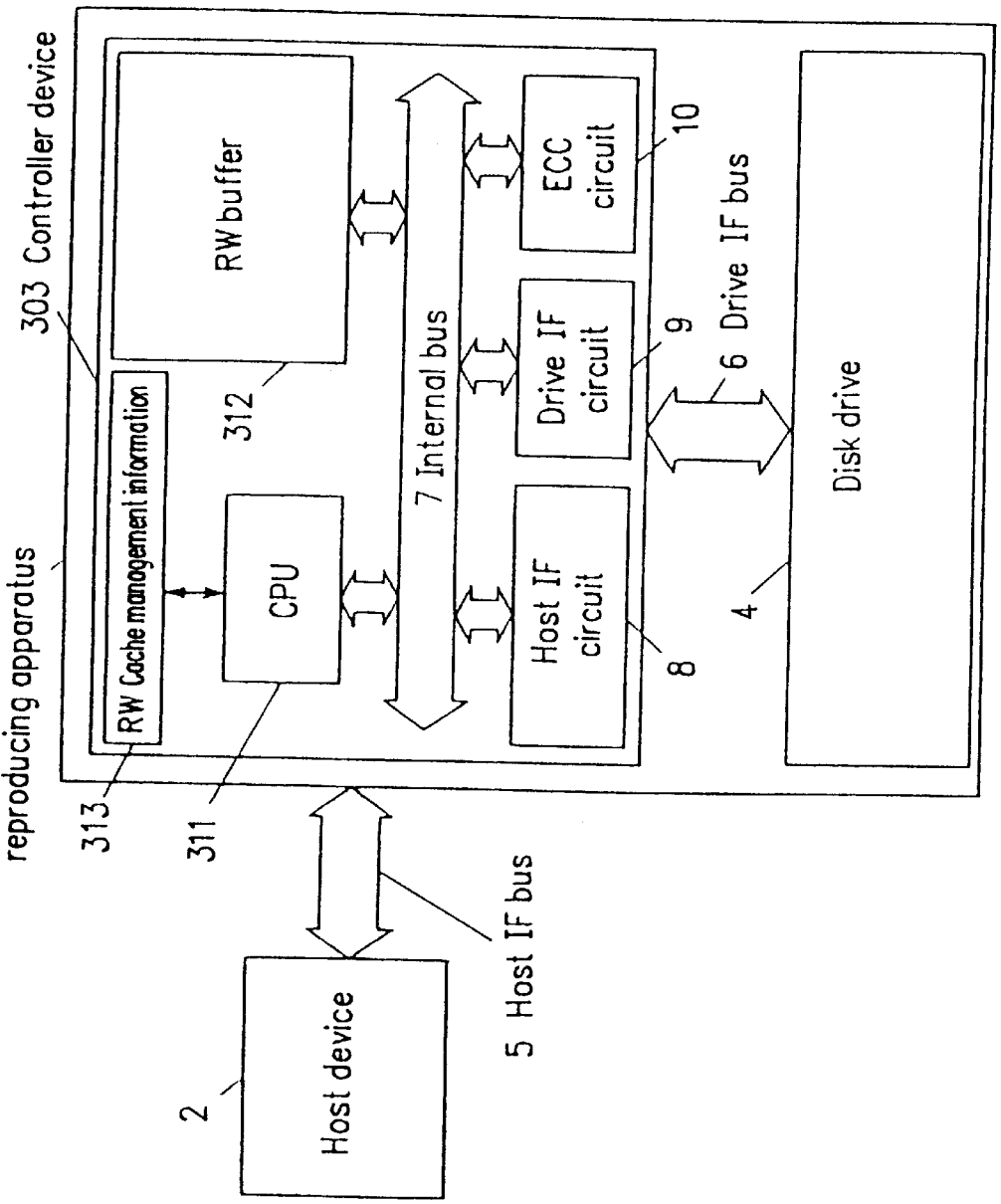
FIG. 16 is a diagram showing the configuration of an information recording and reproducing apparatus according to Example 6 of the present invention.

The method according to Example 6 is an extension of the method of Example 5. Specifically, the method of the present example combines the method of any of Examples 1 to 3 and the method of Example 5. FIG. 16 is a diagram showing the configuration of an information recording and reproducing apparatus according to the present example. In FIG. 16, constituent elements which also appear in FIG. 1 are indicated by the same reference numerals as used therein, and the descriptions thereof are omitted.

In FIG. 16, reference numeral 301 denotes an information recording and reproducing apparatus; 303 denotes a controller device; 311 denotes a CPU; 312 denotes a RW buffer; and 313 denotes RW cache management information. The CPU 311 controls a host IF bus 5 by using a host IF circuit 8 in accordance with a program stored therein, controls a drive IF bus 6 by using a drive IF circuit 9, performs error correction by using an ECC circuit 10, and manages data stored in the RW buffer 312 as cache data by using the RW cache management information 313.

Figure 17:
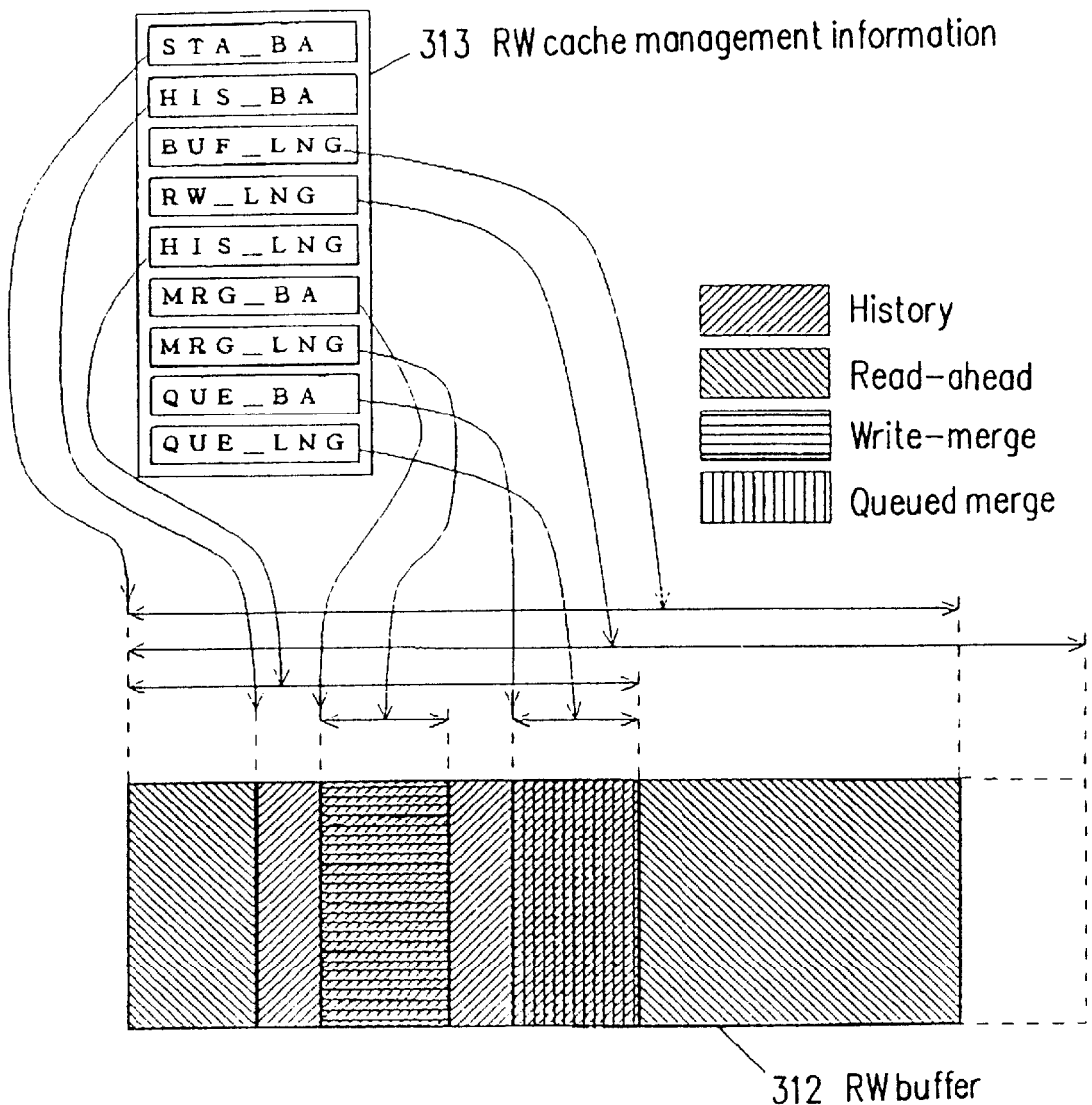
FIG. 17 is a conceptual diagram showing the cache management according to Example 6 of the present invention.

FIG. 17 is a conceptual diagram showing the cache management according to Example 6 of the present invention. FIG. 17 is employed to describe the management by the CPU 311, which manages data in the RW buffer 312 as cache data by using the RW cache management information 313. The RW cache management information 313 includes STA_BA, HIS_BA, BUF_LNG, RW_LNG, HIS_LNG, MRG_BA, MRG_LNG, QUE_BA, and QUE_LNG. STA_BA represents a position on an information recording medium corresponding to the first block which is first stored in the RW buffer 312. HIS_BA represents the position on the information recording medium corresponding to the first block of history data that is not destroyed by read-ahead data. BUF_LNG represents the total capacity of the RW buffer 312 in terms of blocks. RW_LNG represents the number of blocks read from the information recording medium as counted from STA_BA. MRG_BA represents the position of the first block being recorded on the information recording medium. MRG_LNG represents the number of blocks being recorded on the information recording medium. QUE_BA represents the position of the first block queuing to be recorded on the information recording medium. QUE_LNG represents the number of blocks queuing to be recorded on the information recording medium. The region of the RW buffer 312 that is shaded with slanted lines (rising from bottom left to top right) represents history data. The region of the RW buffer 312 that is shaded with slanted lines (rising from bottom right to top left) represents read-ahead data. The region of the RW buffer 312 that is shaded with vertical stripes represents write-merge data. The region of the RW buffer 312 that is shaded with horizontal stripes represents queued merge data.

Figure 18A:
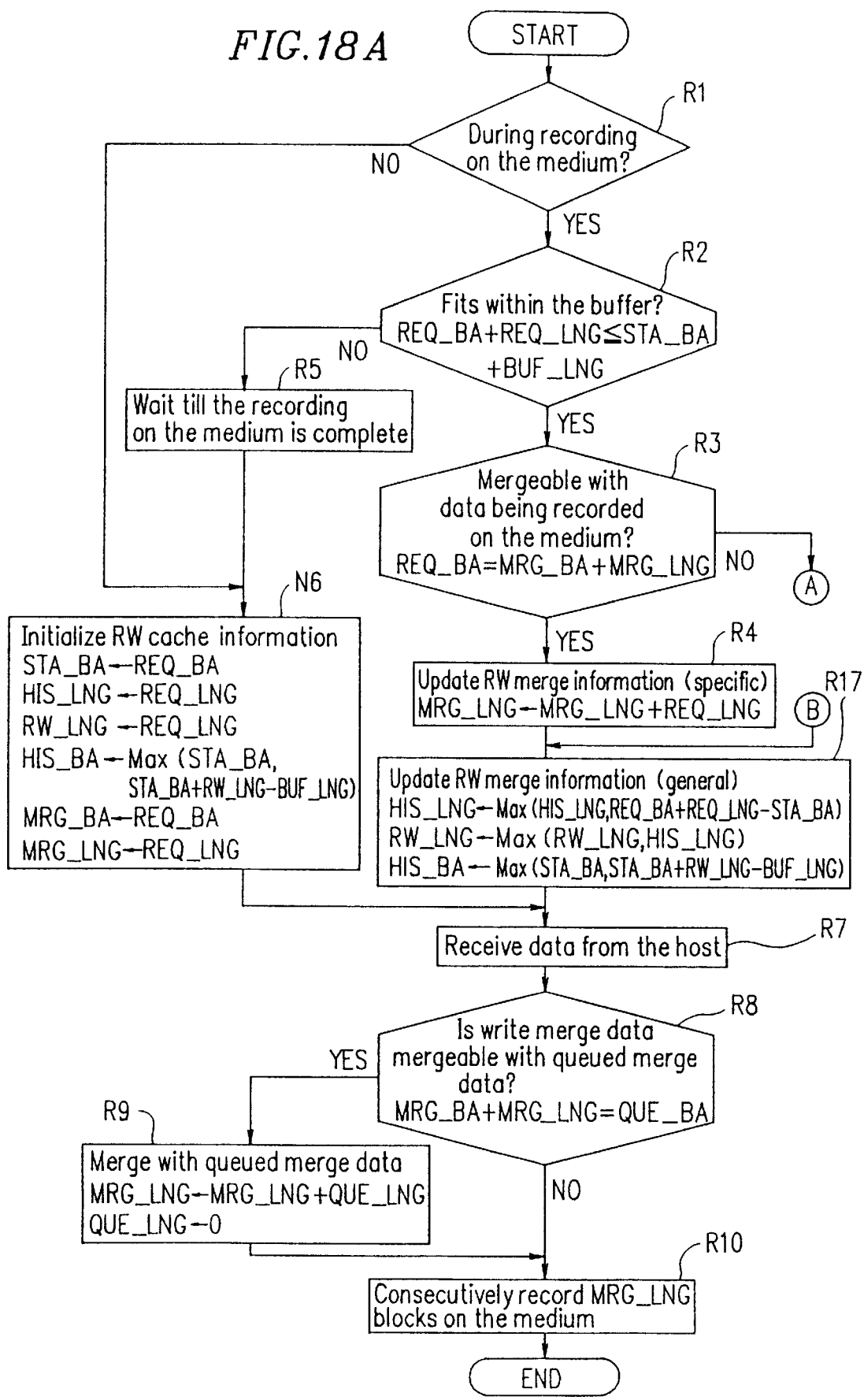
FIG. 18A is a flowchart showing a method of data caching according to Example 6 of the present invention.
Figure 18B:
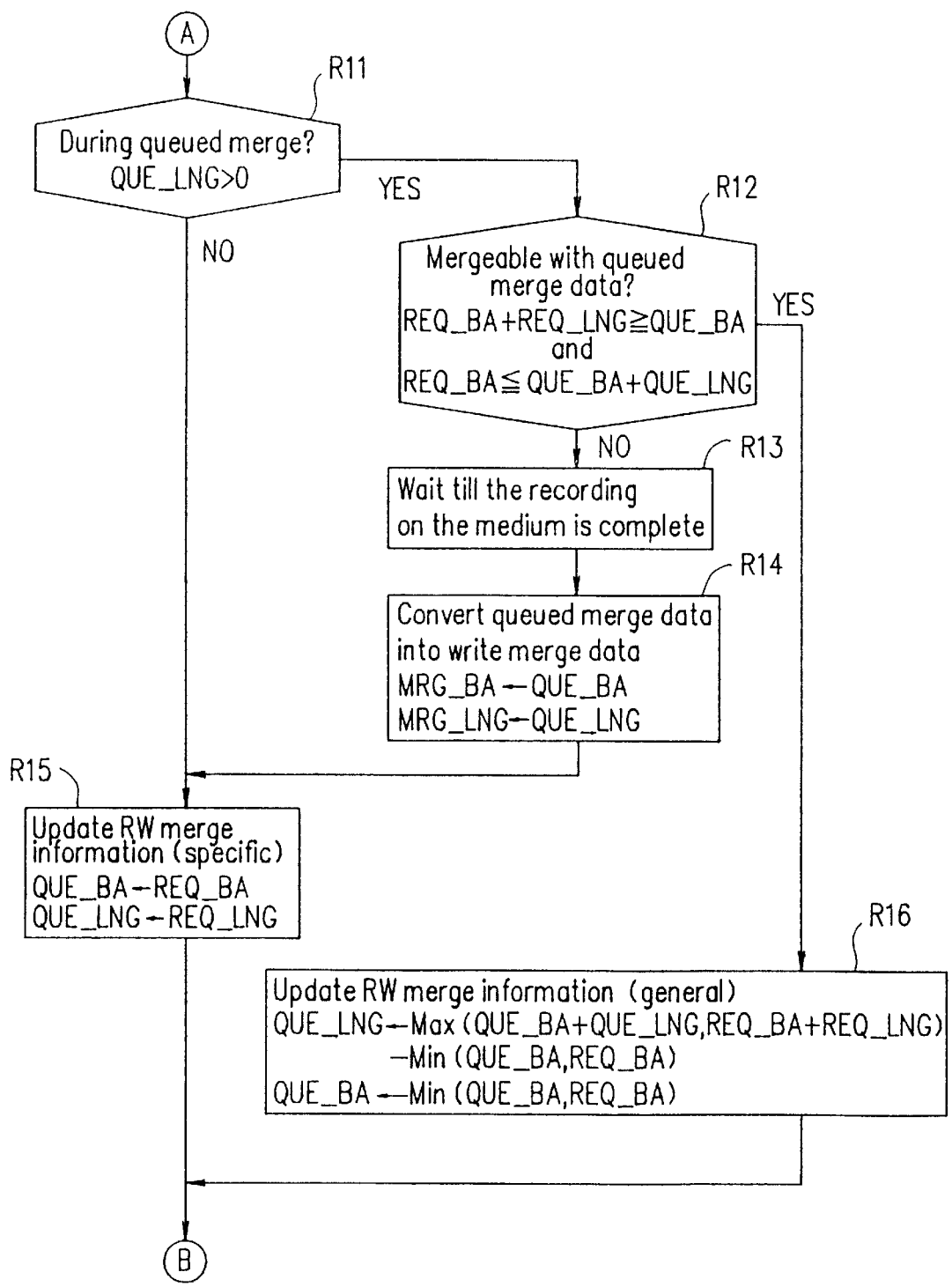
FIG. 18B is a flowchart showing a method of data caching according to Example 6 of the present invention.

FIGS. 18A and 18B are flowcharts showing a method of data caching according to Example 6 of the present invention. As mentioned above, the method according to the present example is an extension of the method of Example 5 such that it combines the method of any of Examples 1 to 3 and the method of Example 5. FIG. 14 (corresponding to Example 5) is identical with FIGS. 18A and 18B except that the updating of the RW cache management information 313, which concerns the read-ahead data and history data, is added at Steps R6 and R17. As in Example 5, the recording operation for the information recording medium is assumed to be performed by the write-back cache method in the background. The position of the first block for which recording has been requested by the host device 2 is defined as REQ_BA, and the number of blocks is defined as REQ_LNG.

(Step R1) It is confirmed whether or not the disk drive 4 is performing a recording operation on the information recording medium by the write-back cache method. If a recording operation is being performed for the information recording medium by the write-back cache method, the control proceeds to Step R2. If not, the control proceeds to Step R6. The condition describing that a recording operation is being performed is MRG_LNG>0.

(Step R2) It is confirmed whether or not the data being recorded on the information recording medium and the already existing cache data both fit within the RW buffer 312. If both data fit within the RW buffer 312, the control proceeds to Step R3. If not, the control proceeds to Step R5. The condition describing that both data fit within the RW buffer 312 is REQ_BA+REQ_LNG≦STA_BA+BUF_LNG.

(Step R3) It is confirmed whether or not the data being recorded on the information recording medium and the data requested to be recorded by the host device 2 can be merged with each other. If the two data can be merged with each other, the control proceeds to Step R4. If not, the control proceeds to Step R11. The condition describing that the two data can be merged with each other is REQ_BA=MRG_BA+MRG_LNG.

(Step R4) The write-merge information is updated so that the data being recorded on the information recording medium and the data requested to be recorded by the host device 2 are merged with each other. The number MRG_LNG of blocks being recorded on the information recording medium is increased by REQ_LNG (Step R5) The control waits until the recording on the information recording medium by the write-back cache method is complete.

(Step R6) The RW cache management information 313 is initialized so that the data requested to be recorded by the host device 2 becomes history data which is being recorded on the information recording medium. As a result, STA_BA and MRG_BA both equal REQ_BA. Moreover, HIS_LNG, RW_LNG, and MRG_LNG all equal REQ_LNG. Furthermore, HIS_BA equals the larger one of (STA_BA) and (STA_BA+RW_LNG−BUF_LNG).

(Step R7) The data requested to be recorded by the host device 2 is received and stored in the RW buffer 312.

(Step R8) It is confirmed whether or not the data being recorded on the information recording medium and queued merge data can be merged with each other. If the two data can be merged with each other, the control proceeds to Step R9. If not, the control proceeds to Step R10. The condition describing that the two data can be merged with each other is MRG_BA+MRG_LNG=QUE_BA.

(Step R9) The data being recorded on the information recording medium is merged with the queued merge data.

MRG_LNG is increased by QUE_LNG. QUE_LNG becomes zero in order to indicate that the queued merge data has been depleted.

(Step R10) The data stored in the number MRG_LNG of blocks is consecutively recorded in the information recording medium.

(Step R11) It is confirmed whether or not any queued merge data exists. If some queued merge data exists, the control proceeds to Step R12. If not, the control proceeds to Step R15. The condition describing that some queued merge data exists is QUE_LNG>0.

(Step R12) It is confirmed whether or not the data requested to be recorded by the host device 2 and the queued merge data can be merged with each other. If the two data can be merged with each other, the control proceeds to Step R16. If not, the control proceeds to Step R13. The condition describing that the two data can be merged with each other is REQ_BA+REQ_LNG≧QUE_BA and REQ_BA≦QUE_BA+QUE_LNG.

(Step R13) The control waits until the recording on the information recording medium by the write-back cache method is complete.

(Step R14) The queued merge data is converted into write-merge data. As a result, MRG_BA equals QUE_BA, and MRG_LNG equals QUE_LNG.

(Step R15) The queued merge information in the RW cache management information 313 is initialized. As a result, QUE_BA equals REQ_BA, and QUE_LNG equals REQ_LNG.

(Step R16) The queued merge information in the RW cache management information 313 is updated so that the queued merge data and the data requested by the host device 2 to be recorded are merged with each other. As a result, QUE_LNG equals a value obtained by subtracting {the smaller one of QUE_BA and REQ_BA} from {the larger one of (QUE_BA+QUE_LNG) and (REQ_BA+REQ_LNG)}. Moreover, QUE_BA equals the smaller one of QUE_BA and REQ_BA.

(Step R17) The RW cache management information 313 is updated so that the data requested to be recorded by the host device 2 is added to the already existing cache data as history data. As a result, HIS_LNG equals the larger one of (HIS_LNG) and (REQ_BA+REQ_LNG-STA_BA). RW_LNG equals the larger one of (RW_LNG) and (REQ_BA+REQ_LNG-STA_BA). Moreover, HIS_BA equals the lager one of (STA_BA) and (STA_BA+RW_LNG-BUF_LNG).

Although a single queued merge structure (i.e.,, a structure including only one stage of queued merge data) is described above, it is also easy to construct a multiple queued merge structure (i.e., a structure including multiple stages of queued merge data.) If the recording operation is completed in the interval between the previous host request and the next one, the control starts from Step R14 in case of some queued merge data existing, and MRG_LNG is set at zero in case of no queued merge data existing.

As described above, the following advantages are provided according to the present example.

(1) The history data and the read-ahead data are managed so as to be centered around the last block that has been requested to be read, and a predetermined amount (i.e., a half of the total capacity of the read-ahead history buffer 12 in this example) of read-ahead data is maintained.

(2) A recording operation is immediately started even if recording is requested by the host device 2 during a read-ahead operation, and both data reproduced from an information recording medium and data to be recorded, which is transmitted from the host device 2, are utilized as read cache data.

(3) When a reproduction is requested by the host device 2 while the disk drive 4 is performing a recording operation on the information recording medium, the recording operation for the information recording medium and a reproduction operation for the host device 2 are performed in parallel.

(4) Accesses localizing around a certain block or more are merged into one recording operation for an information recording medium.

In the present example, the amount of the read-ahead data is maintained at half the total capacity of the RW buffer 312. However, the amount of the read-ahead data is not limited thereto. For example, the amount of the read-ahead data may be maintained at a value obtained by dividing the total capacitance of the RW buffer 312 by an integer. Alternatively, the amount of the read-ahead data may be maintained at an amount corresponding to a multiple of the sectors present in one rotation of the information recording medium.

As described above, according to Example 1 of the present invention, it is possible to universally manage both the history data and the read-ahead data so as to be centered around the last block for which reproduction has been requested by the host device 2. It is also possible to maintain the read-ahead data at a predetermined amount.

According to Example 2 of the present invention, a recording operation is immediately started even if recording is requested by the host device 2 during a read-ahead operation, and both data reproduced from an information recording medium and data to be recorded, which is transmitted from the host device 2, are utilized as read cache data.

According to Example 3 of the present invention, when a reproduction is requested by the host device 2 while the disk drive 4 is performing a recording operation on the information recording medium, the recording operation for the information recording medium and a reproduction operation for the host device 2 are performed in parallel.

According to Example 4 of the present invention, when sequential recording requests are made by the host device 2, the recording requests are converted into a single recording request, whereby the speed of the recording operation for the information recording medium itself is improved.

According to Example 5, when recording requests localizing around a certain block or more are made by the host device 2, the recording requests can be converted into one recording request. As a result, the speed of the recording operation for the information recording medium itself can be improved.

According to Example 6 of the present invention, the methods of Examples 1 to 5 can be easily combined with one another.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording and reproducing apparatus connected to a host device, the information recording and reproducing apparatus comprising:

drive means for recording data in blocks on a disk-shaped recording medium and reproducing data from the blocks of the disk-shaped recording medium;

a record merge buffer for storing data present in those of the blocks for which recording is requested by the host device;

write-back means for, when the data in the blocks for which recording is requested is stored in the record merge buffer, reporting to the host device that a recording operation of the drive means to record the data on the recording medium is complete and successively performing the recording operation;

write-merge means for, when a block corresponding to new data that is requested by the host device to be recorded is continuous with the block corresponding to data being recorded on the recording medium, storing the new data in the record merge buffer, while continuing the recording operation, in such a way that the new data is continuous with the data being recorded, and ensuring that the drive means records the new data and the data being recorded on the recording medium during the same recording operation;

write-queue management means for storing, wherein when the block corresponding to the new data that is requested by the host device to be recorded is not continuous with the block corresponding to the data being recorded on the recording medium, said write queue manegement means for storing stores the new data in the record merge buffer as record pending data in such a way that the new data is at a distance from the data being recorded on the recording medium, the distance in the record merge buffer corresponding to a distance on the recording medium;

queued merge means for storing, wherein when a block corresponding to further new data that is requested to be recorded by the host device is continuous with the block corresponding to the record-pending data, said queue merge means for storing stores the further new data in the record merge buffer in such a way that the further new data is continuous with the recording data; and queue back transition means for ensuring, when the recording operation by the write-back means is complete, that the write-back means starts recording of the data that is record-pending by the write-queue management means.

2. An information recording and reproducing apparatus according to claim 1, wherein said write-merge means stores the new data in the record merge buffer during one of the group consisting of a seek time and a rotation waiting time.

3. A method of data caching for an information recording and reproducing apparatus for recording data in blocks on a disk-shaped recording medium and reproducing data from the blocks of the disk-shaped recording medium, the information recording and reproducing apparatus being connected to a host device, wherein the method comprises:

(a) a step for storing data present in those of the blocks for which recording is requested by the host device in a record merge buffer;

(b) a write-back step for, when the data in the blocks for which recording is requested is stored in the record merge buffer, reporting to the host device that a recording operation of the drive means to record the data on the recording medium is complete and successively performing the recording operation;

(c) a write-merge step for, when a block corresponding to new data that is requested by the host device to be recorded during the recording operation is continuous with the block corresponding to data being recorded on the recording medium, storing the new data in the record merge buffer, while continuing the recording operation, in such a way that the new data is continuous with the data being recorded, and recording the new data and the data being recorded on the recording medium during the same recording operation;

(d) a write-queue management step for storing, wherein when the block corresponding to the new data that is requested by the host device to be recorded is not continuous with the block corresponding to the data being recorded on the recording medium, storing the new data in the record merge buffer as record-pending data in such a way that the new data is at a distance from the data being recorded on the recording medium, the distance in the record merge buffer corresponding to a distance on the recording medium;

(e) a queued merge step for storing, wherein when a block corresponding to further new data that is requested to be recorded by the host device is continuous with the block corresponding to the recording-pending data, storing the further new data in the record merge buffer in such a way that the further new data is continuous with the record-pending data; and (f) a queue back transition step for ensuring, when the recording operation at the write-back step is complete, that the write-back step starts recording of the data that is record-pending at the write-queue management step.

4. A method of data caching according to claim 3 wherein, during said write-merge step, the new data is stored in the record merge buffer during one of the group consisting of a seek time and a rotation waiting time.

* * * * *